United States Patent
Kanazawa et al.

(10) Patent No.: US 7,826,913 B2
(45) Date of Patent: *Nov. 2, 2010

(54) SHEET METAL FACTORY PROCESSING SYSTEM

(75) Inventors: Masato Kanazawa, Kanagawa (JP); Kaoru Nakamura, Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/680,747

(22) Filed: Mar. 1, 2007

(65) Prior Publication Data

US 2007/0150083 A1 Jun. 28, 2007

Related U.S. Application Data

(63) Continuation of application No. 10/985,050, filed on Nov. 10, 2004, now Pat. No. 7,239,931.

(60) Provisional application No. 60/519,272, filed on Nov. 13, 2003.

(51) Int. Cl.
G06F 19/00 (2006.01)
(52) U.S. Cl. .................. 700/100; 700/105; 700/145
(58) Field of Classification Search .................. 700/95, 700/97, 98–103, 105, 117, 127, 145, 165, 700/182; 705/7, 8; 703/6, 7
See application file for complete search history.

(56) References Cited

U.S. PATENT DOCUMENTS 6,185,476 B1 2/2001 Sakai 6,233,538 B1* 5/2001 Gupta et al. .................. 703/6
6,243,611 B1* 6/2001 Hazama et al. ............... 700/97
6,714,828 B2* 3/2004 Eldridge et al. ............... 700/97

FOREIGN PATENT DOCUMENTS

| JP | 2-165867 | 6/1990 |
|---|---|---|
| JP | 11-10491 | 1/1991 |
| JP | 7-056619 | 3/1995 |
| JP | 11-010491 | 1/1999 |
| JP | 2000-141181 | 5/2000 |
| JP | 2002-073137 | 3/2002 |
| JP | 2002-108431 | 4/2002 |
| WO | 98/10890 | 3/1998 |

OTHER PUBLICATIONS

English language Abstract of JP 11-010491.
English language Abstract of JP 2002-073137.
English language Abstract of JP 7-056619.
English language translation of JP 2000-141181, May 23, 2000.

* cited by examiner

Primary Examiner—Charles R Kasenge
(74) Attorney, Agent, or Firm—Greenblum & Bernstein, P.L.

(57) ABSTRACT

A sheet metal factory processing system includes a production manager which generates a processing schedule for multiple units each including at least one material sheet, to manage the processing schedule on a per-unit basis. The processing schedule is generated based on sheet processing data obtained by allocating parts to be blanked from the material sheets according to a manufacturing designation. The sheet metal factory processing system also includes a sheet metal factory processing installation which is connected to the production manager through a communication network. The sheet metal factory processing installation receives the generated processing schedule from the production manager and executes the received processing schedule.

11 Claims, 27 Drawing Sheets

| PART | THE NUMBER OF SHEETS | DUE DATE | PROCESSING MACHINE |
|---|---|---|---|
| P1 | 5 | 9-20 | LASER |
| P2 | 6 | 9-20 | LASER |
| P3 | 2 | 9-20 | LASER |
| P4 | 1 | 9-20 | LASER |
| | | | |

FIG.4

| SHEET | THE NUMBER OF SHEETS | DUE DATE | PROCESSING MACHINE | RESERVING STATUS |
|---|---|---|---|---|
| S1 | 3 | 9-20 | #1 LASER | |
| S2 | 2 | 9-20 | #1 LASER | |
| | | | | |

FIG.5

| SHEET | THE NUMBER OF SHEETS | DUE DATE | PROCESSING MACHINE | RESERVING STATUS |
|---|---|---|---|---|
| S1-1 | 1 | 9-20 | #1 LASER | (UNATTACKED) |
| S1-2 | 1 | 9-20 | #1 LASER | (UNATTACKED) |
| S1-3 | 1 | 9-20 | #1 LASER | (UNATTACKED) |
| S2-1 | 1 | 9-20 | #1 LASER | (UNATTACKED) |
| S2-2 | 1 | 9-20 | #1 LASER | (UNATTACKED) |
| | | | | |

| SHEET | THE NUMBER OF SHEETS | DUE DATE | PROCESSING MACHINE | RESERVING STATUS |
|---|---|---|---|---|
| S1-1 | 1 | 9-20 | #1 LASER | ONE SHEET OF #1 LASER |
| S1-2 | 1 | 9-20 | #1 LASER | ONE SHEET OF #1 LASER |
| S1-3 | 1 | 9-20 | #1 LASER | UNATTACKED |
| S2-1 | 1 | 9-20 | #1 LASER | UNATTACKED |
| S2-2 | 1 | 9-20 | #1 LASER | UNATTACKED |
|  |  |  |  |  |

| PART | THE NUMBER OF SHEETS | DUE DATE | PROCESSING MACHINE |   |
|---|---|---|---|---|
| P1 | 5 | 9-20 | LASER |  |
| P2 | 6 | 9-20 | LASER |  |
| P3 | 2 | 9-20 | LASER |  |
| P4 | 1 | 9-20 | LASER |  |
| P5 | 4 | 9-20 | LASER |  ADDITION |
|  |  |  |  |  |

FIG.8

| SHEET | THE NUMBER OF SHEETS | DUE DATE | PROCESSING MACHINE | RESERVING STATUS |
|---|---|---|---|---|
| S3 | 2 | 9-20 | #1 LASER | |
| S4 | 2 | 9-20 | #1 LASER | |
| S5 | 1 | 9-20 | #1 LASER | |
| | | | | |

FIG.9

| SHEET | THE NUMBER OF SHEETS | DUE DATE | PROCESSING MACHINE | RESERVING STATUS |
|---|---|---|---|---|
| S1-1 | 1 | 9-20 | #1 LASER | ONE SHEET OF #1 LASER |
| S1-2 | 1 | 9-20 | #1 LASER | ONE SHEET OF #1 LASER |
| S3-1 | 1 | 9-20 | #1 LASER | ONE SHEET OF #1 LASER |
| S3-2 | 1 | 9-20 | #1 LASER | UNATTACKED |
| S4-1 | 1 | 9-20 | #1 LASER | UNATTACKED |
| S4-2 | 1 | 9-20 | #1 LASER | UNATTACKED |
| S5-1 | 1 | 9-20 | #1 LASER | UNATTACKED |
| | | | | |

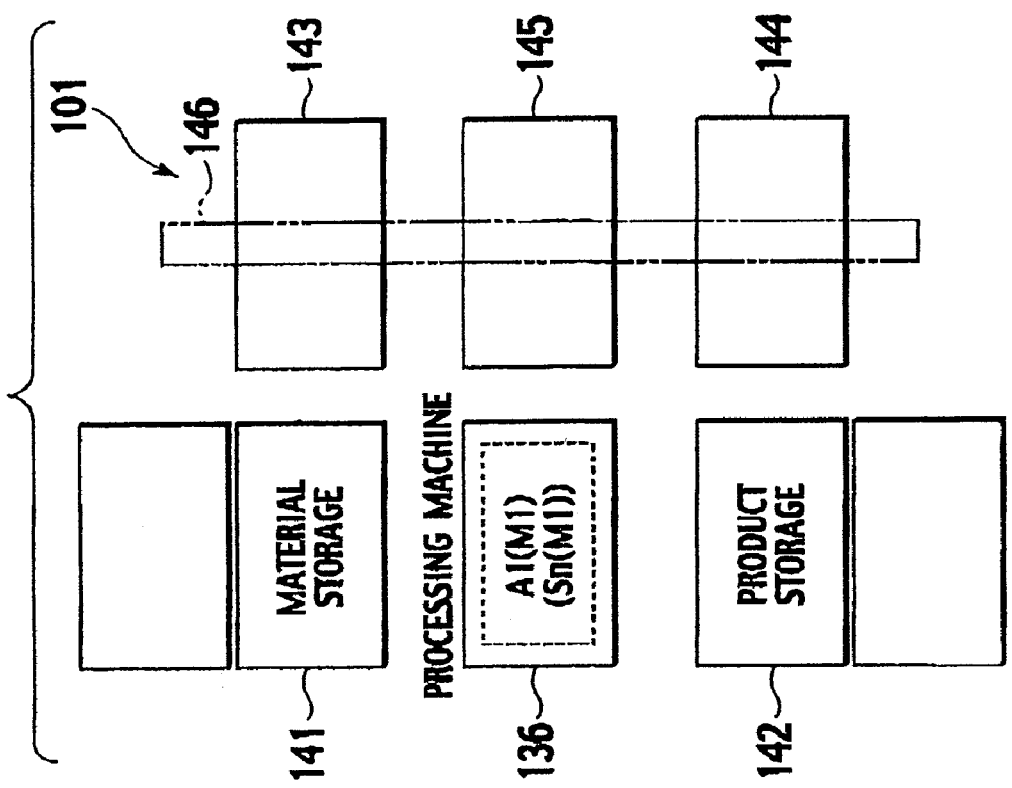
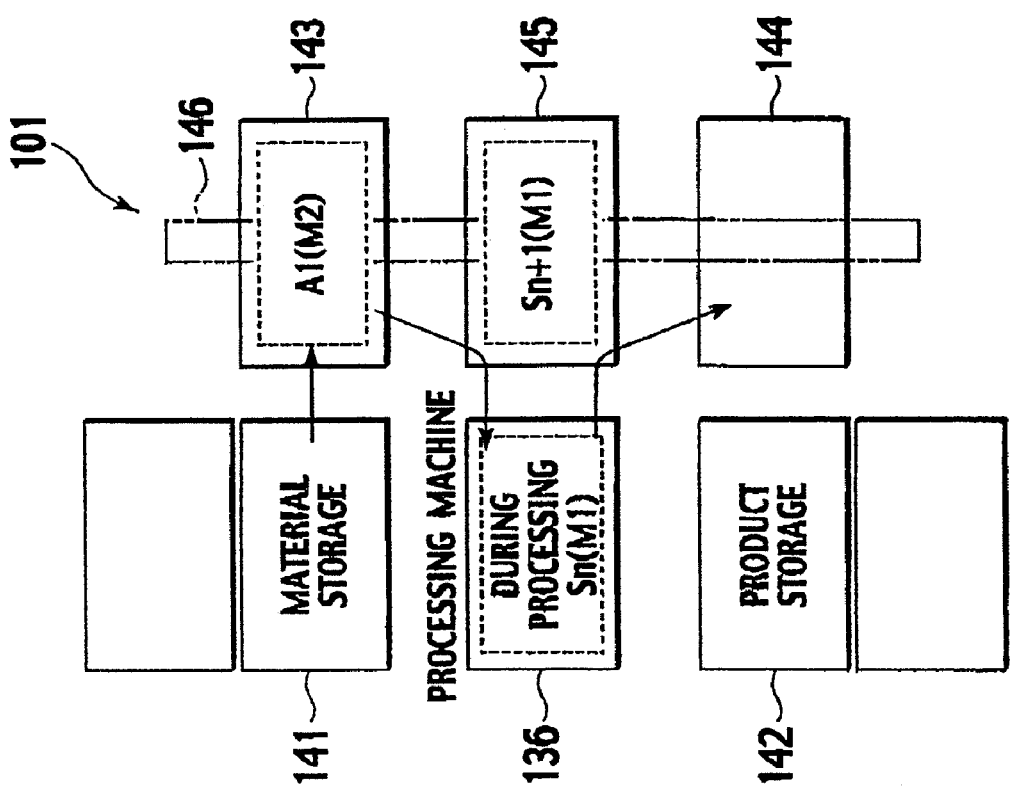

SHEET METAL FACTORY PROCESSING SYSTEM

CROSS-REFERENCE TO RELATED APPLICATIONS

The present application is a continuation application of pending U.S. patent application Ser. No. 10/985,050, filed on Nov. 10, 2004, which claims the benefit of U.S. provisional Patent Application No. 60/519,272, filed Nov. 13, 2003, the contents of which are expressly incorporated by reference herein in their entireties.

BACKGROUND OF THE INVENTION

The present invention relates to a sheet metal factory processing system, which nests part data in a material sheet, and processes it by a processing machine.

DESCRIPTION OF THE RELATED ART

Conventionally, in the sheet metal factory processing system constituted by a production management apparatus and a sheet metal factory processing installation, the production management apparatus generates a manufacturing designation (manufacturing arrangement), and the sheet metal factory processing installation execute a processing schedule on the basis of the manufacturing designation.

In some conventional sheet metal factory processing system of this type, when a production management apparatus generates a manufacturing designation, the production management apparatus also generates a processing schedule including nesting of part data and a CAM process and gives the manufacturing designation including the processing schedule to sheet metal factory processing installation to cause the sheet metal factory processing installation to perform a schedule operation according to an executable processing schedule based on the manufacturing designation.

In some sheet metal factory processing system of this type, a production management apparatus merely generates a manufacturing designation, a sheet metal factory processing installation which receives the manufacturing designation from the production management apparatus generates a processing schedule including nesting of part data and a CAM process from the manufacturing designation by using a controller and performs a schedule operation according to the processing schedule (for example, see Japanese Patent Application Laid-Open (JP-A) No. 11-10491).

However, both the conventional sheet metal factory processing systems have various problems.

That is, in the sheet metal factory processing system in which the production management apparatus also generates a processing schedule, after a manufacturing designation (manufacturing arrangement) including the processing schedule is once given from the production management apparatus to the sheet metal factory processing installation, the sheet metal factory processing installation performs only a schedule operation on the basis of the given manufacturing designation.

For this reason, in the schedule operation performed by the sheet metal factory processing installation on the basis of the manufacturing designation, for example, it is assumed that a change such as an addition must be made to the manufacturing designation by the production management apparatus. In this case, even though the production management apparatus tries to change the processing schedule on the basis of the change of the manufacturing designation, the production management apparatus cannot easily change the processing schedule while correcting the processing schedule which has been given to the sheet metal factory processing installation in advance because the progress of the schedule operation, which is being executed by the sheet metal factory processing installation is unknown.

Therefore, for the production management apparatus the sheet metal factory processing installation cannot be easily and smoothly operated on the basis of the desired manufacturing designation. In addition, since the sheet metal factory processing installation is not smoothly operated on the basis of the manufacturing designation, an unnecessary waiting time cannot be easily shortened, and the operating rate and the production efficiency of the sheet metal factory processing installation cannot easily improved.

Furthermore, in a sheet metal factory processing system in which a sheet metal factory processing installation generates a processing schedule by using a controller, the data processing ability of the controller is inevitably inferior to the data processing ability of the production management apparatus.

For this reason, for example, the sheet metal factory processing system cannot easily cope with a case in which a large amount of data processing is required to generate a processing schedule including nesting of part data and a CAM process for a manufacturing designation given by the production management apparatus as in multi-product multi-volume production or a case in which necessary data processing must be frequently performed to manufacturing designations sequentially given by the production management apparatus as in single-product uniform production.

Therefore, for the production management apparatus, the sheet metal factory processing installation cannot be easily and smoothly operated on the basis of a desired manufacturing designation. Since the sheet metal factory processing installation is not smoothly operated on the basis of the manufacturing designation, an unnecessary waiting time cannot be easily shortened, and the operating rate and the production efficiency of the sheet metal factory processing installation cannot be easily improved.

SUMMARY OF THE INVENTION

The present invention has been made to solve the above problem, and has as its object to provide a sheet metal factory processing system which can smoothly operate a sheet metal factory processing installation based on a desired manufacturing designation for a production management apparatus and which can improve the operating raze and the production efficiency of the sheet metal factory processing installation.

A first aspect of the invention provides a sheet metal factory processing system comprising a production management apparatus which generates a processing schedule based on sheet processing data obtained by nesting according to a manufacturing designation to manage the processing schedule in each unit of material sheets; and a sheet metal factory processing installation which is mutually connected to the production management apparatus through a communication network to execute the processing schedule received from the production management apparatus.

A second aspect of the invention provides the sheet metal factory processing system according to the first aspect of the invention, wherein, before all the processing schedules based on the manufacturing designation are completely executed by the sheet metal factory processing installation, when one selected from an addition or a change is made to the manufacturing designation, the production management apparatus integrates an unexecuted processing schedule included in the manufacturing designation with the content of the selected one from the addition or the change to regenerate a processing schedule based on the sheet processing data obtained by nesting according to a new manufacturing designation.

A third aspect of the invention provides a sheet metal factory processing system comprising a production management apparatus which generates a processing schedule based on sheet processing data obtained by nesting according to a manufacturing designation to manage the processing schedule in each unit of material sheets; and a sheet metal factory processing installation which is mutually connected to the production management apparatus through a communication network to execute the processing schedule received from the production management apparatus, and wherein the production management apparatus transmits the processing schedule for each of the material sheets to every processing schedule requests from the sheet metal factory processing installation.

A fourth aspect of the invention provides the sheet metal factory processing system according to the third aspect of the invention, wherein, before all the processing schedules based on the manufacturing designation are completely executed by the sheet metal factory processing installation, when one selected from an addition or a change is made to the manufacturing designation, the production management apparatus integrates an unexecuted processing schedule included in the manufacturing designation with the content of the selected one from the addition or the change to regenerate a processing schedule based on the sheet processing data obtained by nesting according to a new manufacturing designation.

A fifth aspect of the invention provides a sheet metal factory processing system comprising a production management apparatus which generates a processing schedule based on sheet processing data obtained by nesting according to a manufacturing designation to manage the processing schedule in each unit of material sheets; and a sheet metal factory processing installation which is mutually connected to the production management apparatus through a communication network to execute the processing schedule received from the production management apparatus, and wherein in response to a processing schedule request from the sheet metal factory processing installation, the production management apparatus transmits the processing schedule of one next material sheet to the sheet metal factory processing installation at a timing when processing end estimated time of the preceding material sheet in the sheet metal factory processing installation and convey-in preparation completion estimated time of the next material sheet in the sheet metal factory processing installation are synchronized with each other.

A sixth aspect of the invention provides the sheet metal factory processing system according to the fifth aspect of the invention, wherein, before all the processing schedules based on the manufacturing designation are completely executed by the sheet metal factory processing installation, when one selected from an addition or a change is made to the manufacturing designation, the production management apparatus integrates an unexecuted processing schedule included in the manufacturing designation with the content of the selected one from the addition or the change to regenerate a processing schedule based on the sheet processing data obtained by nesting according to a new manufacturing designation.

A seventh aspect of the invention provides a sheet metal factory processing system comprising a production management apparatus which generates a processing schedule based on sheet processing data obtained by nesting according to a manufacturing designation to manage the processing schedule in each unit of material sheets; and a plurality of sheet metal factory processing installations which are connected to the production management apparatus through a communication network to independently execute the processing schedules received from the production management apparatus.

A eighth aspect of the invention provides the sheet metal factory processing system according to the seventh aspect of the invention, wherein, before all the processing schedules based on the manufacturing designation are completely executed by each of the sheet metal factory processing installations, when one selected from an addition or a change is made to the manufacturing designation, the production management apparatus integrates an unexecuted processing schedule included in the manufacturing designation with the content of the selected one from the addition or the change to regenerate a processing schedule based on the sheet processing data obtained by nesting according to a new manufacturing designation.

A ninth aspect of the invention provides a sheet metal factory processing system comprising a production management apparatus which generates a processing schedule based on sheet processing data obtained by nesting according to a manufacturing designation to manage the processing schedule in each unit of material sheets; and a plurality of sheet metal factory processing installations which are connected to the production management apparatus through a communication network to independently execute the processing schedules received from the production management apparatus, and wherein the production management apparatus transmits the processing schedule for each of the material sheets to the every processing schedule requests from each of the sheet metal factory processing installations.

A tenth aspect of the invention provides the sheet metal factory processing system according to the ninth aspect of the invention, wherein, before all the processing schedules based on the manufacturing designation are completely executed by each of the sheet metal factory processing installations, when one selected from an addition or a change is made to the manufacturing designation, the production management apparatus integrates an unexecuted processing schedule included in the manufacturing designation with the content of the selected one from the addition or the change to regenerate a processing schedule based on the sheet processing data obtained by nesting according to a new manufacturing designation.

A eleventh aspect of the invention provides a sheet metal factory processing system comprising a production management apparatus which generates a processing schedule based on sheet processing data obtained by nesting according to a manufacturing designation to manage the processing schedule in each unit of material sheets; and a plurality of sheet metal factory processing installations which are connected to the production management apparatus through a communication network to independently execute the processing schedules received from the production management apparatus, and wherein in response to a processing schedule request from each of the sheet metal factory processing installations, the production management apparatus transmits the processing schedule of one next material sheet to the corresponding sheet metal factory processing installation at a timing when processing end estimated time of the preceding material sheet in the corresponding sheet metal factory processing installation and convey-in preparation completion estimated time of the next material sheet in the sheet metal factory processing installation are synchronized with each other.

A twelfth aspect of the invention provides the sheet metal factory processing system according to the eleventh aspect of the invention, wherein, before all the processing schedules based on the manufacturing designation are completely executed by each of the sheet metal factory processing installations, when one selected from an addition or a change is made to the manufacturing designation, the production management apparatus integrates an unexecuted processing schedule included in the manufacturing designation with the content of the selected one from the addition or the change to regenerate a processing schedule based on the sheet processing data obtained by nesting according to a new manufacturing designation.

A thirteenth aspect of the invention provides a processing schedule management method wherein a processing schedule of a material sheet obtained by nesting a part on the basis of a manufacturing designation, the processing schedule being obtained by a sheet metal factory processing installation, is managed in each unit of the sheets.

A fourteenth aspect of the invention provides a processing schedule management method wherein depending on one selected from an addition or a change, an unprocessed part in a processing schedule based on a previous manufacturing designation is nested in a material sheet again while being included in the content of one selected from the addition or the change of the manufacturing designation, so that a subsequent processing schedule can be reformed.

A fifteenth aspect of the invention provides a processing schedule management method wherein a part unprocessed in a processing schedule based on a previous manufacturing designation cannot be processed due to a state of a sheet metal factory processing installation, the unprocessed part is nested in another material sheet again, so that a subsequent processing schedule is reformed.

A sixteenth aspect of the invention provides a processing schedule management method wherein in order to synchronize a convey-out operation of a product included in a processing schedule which is being executed in an sheet metal factory processing installation with a convey-out operation of a material used in a next processing schedule, the next processing schedule is started.

A seventeenth aspect of the invention provides a processing schedule management method wherein when a material sheet used in a processing schedule based on a previous manufacturing designation has not been processed, the processing schedule based on the previous manufacturing designation is canceled depending on an addition to the manufacturing designation, and the added part is allocated to the material sheet to execute processing.

A eighteenth aspect of the invention provides a processing schedule management method wherein when a material sheet used in a processing schedule based on a previous manufacturing designation is being processed, processing of an unprocessed part of parts arranged on the material sheet is canceled depending on an addition to the manufacturing designation, and the added part is allocated to an unused region including an arrangement position of the unprocessed part on the material sheet to execute processing.

A nineteenth aspect of the invention provides a processing schedule management method wherein when a material sheet used in a processing schedule based on a previous manufacturing designation has been processed in a sheet metal factory processing installation, depending on an addition to the manufacturing designation, the added part is allocated to the rest of the blank region of the material sheet on which the part is processed to execute processing.

A twentieth aspect of the invention provides a program which causes a computer arranged in one selected from a production management apparatus or a sheet metal factory processing installation to execute a process including the step of, depending on one selected from an addition or a change of a manufacturing designation, including a part unprocessed in a processing schedule based on a previous manufacturing designation in a content of one selected from the addition or the change of the manufacturing designation; and the step of nesting a content of the addition or the change of the manufacturing designation including the unprocessed part in a material sheet again.

A twenty-first aspect of the invention provides a program which causes a computer arranged in one selected from a production management apparatus or a sheet metal factory processing installation to execute a process including the step of deciding a change in state of the sheet metal factory processing installation; and the step of, depending on a change in state at which processing of an unprocessed part cannot be performed in a processing schedule based on a previous manufacturing designation in the sheet metal factory processing installation, nesting the unprocessed part in another material sheet.

The invention, as described above, includes a production management apparatus which generates a processing schedule based on a manufacturing designation to manage the processing schedule in each unit of material sheets and a sheet metal factory processing installation which is mutually connected to the production management apparatus through a communication network to execute the processing schedule received from the production management apparatus. For this reason, for the production management apparatus, the sheet metal factory processing installation can be smoothly operated on the basis of a desired manufacturing designation, and the operating rate and the production efficiency of the sheet metal factory processing installation can be advantageously improved.

BRIEF DESCRIPTION OF THE DRAWINGS

FIG. 4 is a table showing a blank layout result of a processing schedule based on the manufacturing designation in FIG. 3;

FIG. 5 is a table showing a processing schedule for each material sheet based on the manufacturing designation in FIG. 3;

FIG. 8 is a table showing a blank layout result of a processing schedule based on the additional manufacturing designation;

FIG. 9 is a table showing a processing schedule for each material sheet based on the additional manufacturing designation;

FIG. 12 is a schematic layout diagram showing a third example of the interrupt function in the sheet metal factory processing system in FIG. 1;

FIG. 13 is a schematic layout diagram showing a fourth example of the interrupt function in the sheet metal factory processing system in FIG. 1;

DETAILED DESCRIPTION OF THE PREFERRED EMBODIMENTS

Embodiments of the invention will be described below with reference to the accompanying drawings.

Figure 1:
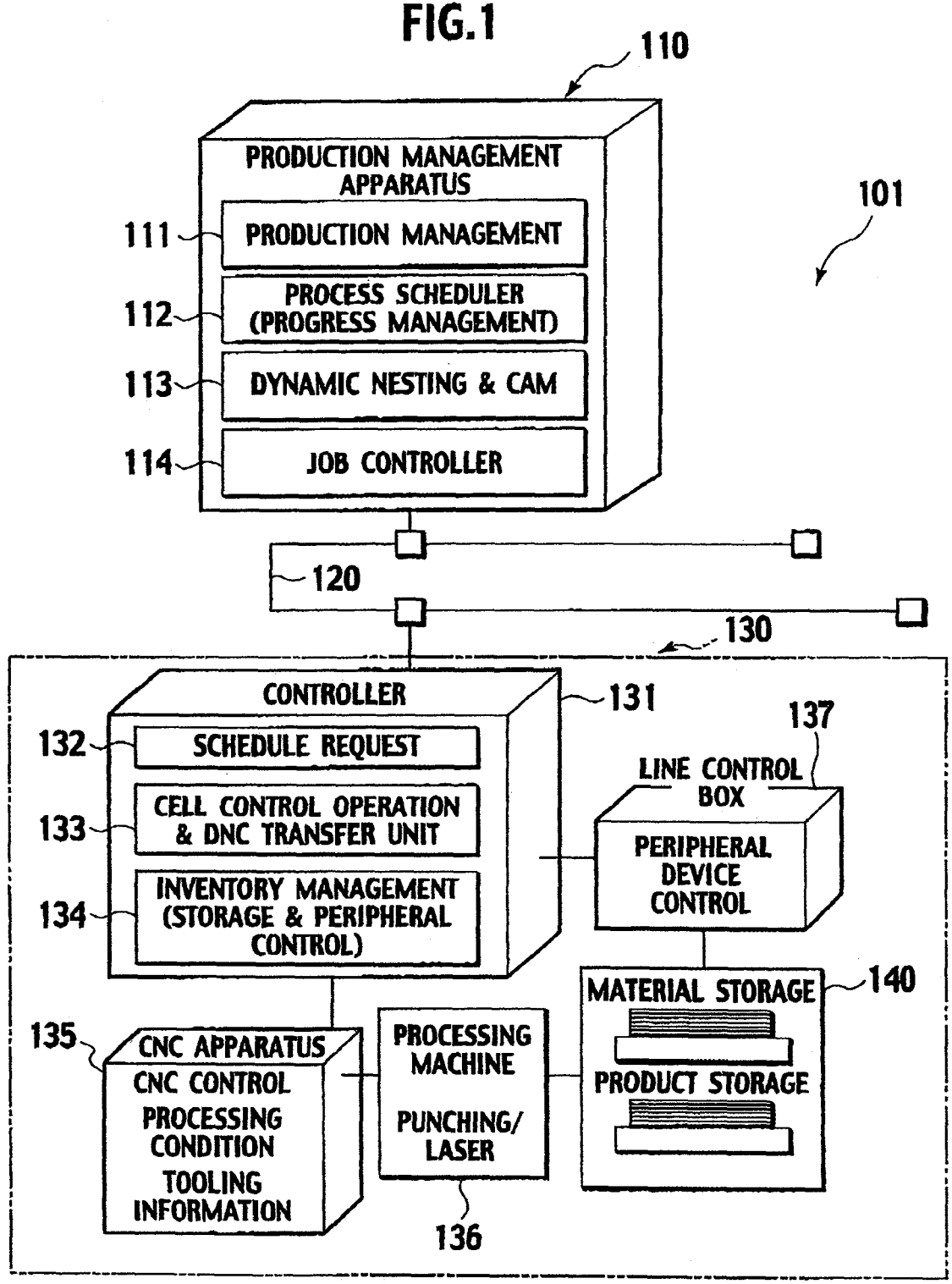
FIG. 1 is a schematic block diagram showing a first embodiment of a sheet metal factory processing system according to the invention.

FIG. 1 is a schematic block diagram showing a first embodiment of a sheet metal factory processing system according to the invention. In the sheet metal factory processing system 101, a production management apparatus 110 and a sheet metal factory processing installation 130 are communicably combined to each other, and the sheet metal factory processing installation 130 executes the processing schedule on the basis of a manufacturing designation (manufacturing arrangement) generated by the production management apparatus 110.

The production management apparatus 110 includes a production management unit 111, a process scheduler (progress management) 112, a dynamic nesting & CAM processing unit 113, and a job controller 114. The production management apparatus 110 is connected to a network 120.

The production management unit 111 performs various processes required for production management and generates a necessary manufacturing designation on the basis of the production management to manage the manufacturing designation.

The process scheduler (progress management) 112 generates a processing schedule executed by the sheet metal factory processing installation 130 on the basis of the manufacturing designation obtained by the production management unit 111 to manage the processing schedule.

The dynamic nesting & CAM processing unit 113 performs a blank layout process for nesting part data in a material sheet and a CAM process for generating processing data of the material sheet in generation of the processing schedule by the process scheduler (progress management) 112.

The job controller 114 exchanges various data with a controller 131 of the sheet metal factory processing installation 130 through the network 120. The job controller 114 exchanges various necessary data with the respective components of the production management apparatus 110.

The sheet metal factory processing installation 130 includes the controller 131, a CNC device 135, a processing machine 136, a line control box 137, and a peripheral device 140. In the sheet metal factory processing installation 130, the controller 131 is connected to the network 120.

The controller 131 exchanges various data with the job controller 114 of the production management apparatus 110 through the network 120. Additionally, the controller 131 exchanges various necessary data with the components of the sheet metal factory processing installation 130.

The controller 131 includes a schedule request unit 132 which requests a processing schedule to the job controller 114 of the production management apparatus 110 and which receives the processing schedule from the job controller 114, a cell control operation and DNC transfer unit 133, and a inventory management (storage and peripheral control) unit 134.

Data and a program of software instructions which are described herein as being stored are stored on a computer readable medium. A computer readable medium is a tangible medium upon which data and a program of software instructions can be stored and from which data and a program of software instructions can be read.

The CNC device 135 forms an executable NC data on the basis of the processing schedule received by the controller 131 from the job controller 114 in response to the schedule request in consideration of processing condition and tooling information.

The CNC device 135 reads processing data of a part designated by the processing schedule to control the processing machine 136.

As the processing machine 136, for example, a punching (punching press machine), a laser (laser processing machine), or the like is applied. The processing machine 136 executes a required sheet metal processing (sheet processing) in cooperation with the peripheral device 140 on the basis of NC data from the CNC device 135.

In execution of desired sheet metal processing (sheet processing) by the processing machine 136, the line control box 137 operates the peripheral device 140 in cooperation with the processing in machine 136 on the basis of the processing schedule received by the controller 131 from the job controller 114 in response to the schedule request.

Figures 2, 3:
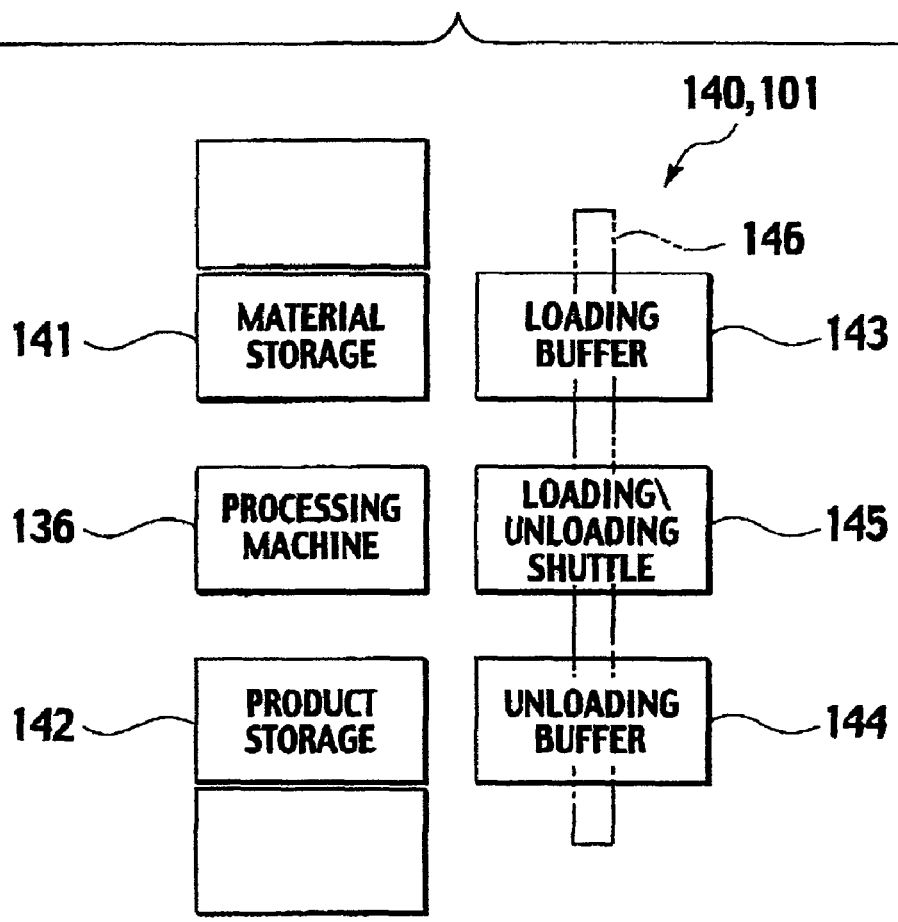
FIG. 2 is a schematic diagram showing an arrangement of peripheral devices in the sheet metal factory processing system in FIG. 1.
FIG. 3 is a table showing an example of a manufacturing designation in the sheet metal factory processing system in FIG. 1.

FIG. 2 is a schematic diagram showing an arrangement of the peripheral device 140. The peripheral device 140 includes storages such as a material storage 141 and a product storage 142 which are arranged around the processing machine 136, waiting spaces such as a loading buffer 143 and a unloading buffer 144 arranged adjacent to these storages, a loading/unloading shuttle 145 arranged adjacent to the processing machine 136, and a single-sheet pickup and conveying device 146.

As the single-sheet pickup and conveying device 146, a travelling region along a direction in the waiting spaces are aligned is schematically shown in FIG. 2. In the single-sheet pickup and conveying device 146, a carrier which has a large number of vacuum pads covering a plane having a size corresponding to the size of a material sheet is travelably supported along a traveling rail arranged above such that the vacuum pads can be vertically moved.

In the single-sheet pickup and conveying device 146, the carrier is designed to be able to move forward from the traveling region along the traveling rail to the side and to move backward into the traveling region.

For this reason, the peripheral device 140, as shown in FIG. 2, can execute various operations, which handle a material sheet.

More specifically, the single-sheet pickup and conveying device 146 can pick up one material sheet front the material storage 141, can convey the metal sheet, and can place the metal sheet on the loading buffer 143.

Additionally, the single-sheet pickup and conveying device 146 can pick up a material sheet from the loading buffer 143, and can convey the metal sheet, and can place the metal sheet on the loading/unloading shuttle 145.

More over, the loading/unloading shuttle 145 can load the material sheet on the processing machine 136.

The loading/unloading shuttle 145 can unload the processed sheet (product) from the processing machine 136.

The single-sheet pickup and conveying device 146 can pick up one processed sheet (product) from the loading/unloading shuttle 145, can convey the processed sheet, and can place the processed sheet (sort and accumulate) on the unloading buffer 144.

The single-sheet pickup and conveying device 146 can pick one processed sheet from the unloading buffer 144, can convey the processed sheet, and can store the processed sheet on the product storage 142.

The single-sheet pickup and conveying device 146 can include only one carrier such that the single carrier can be commonly used in a single-sheet pickup and conveying operation of a material sheet frown the material storage 141 to the processing machine 136 and a single-sheet pickup and conveying operation of the single sheet from the processing machine 136 to the product storage 142.

In the single-sheet pickup and conveying device 146, a carrier which performs a single-sheet pickup and conveying operation of a material sheet from the material storage 141 to the processing machine 136 and a carrier which performs a single-sheet pickup and conveying operation of the material sheet from the processing machine 136 to the product storage 142 can be independently arranged.

The dynamic nesting & CAM processing unit 113 of the production management apparatus 110 has a processing time simulation function which calculates required time from when the processing is started after one material sheet is loaded on the processing machine 136 to when the processing is ended.

The production management apparatus 110 records, as data, the actual time required for delivery, i.e., time until a material sheet is picked up from the material storage 141 and placed on the loading/unloading shuttle 145 through the loading buffer 143 in the past.

The controller 131 of the sheet metal factory processing installation 130 is designed to generate the next schedule request immediately after one material sheet is conveyed out of the loading buffer 143 to the loading/unloading shuttle 145 to make the loading buffer 143 empty.

The production management apparatus 110 is designed such that, when the job controller 114 receives the schedule request from the controller 131, the production management apparatus 110 gives the processing schedule of one material sheet to the sheet metal factory processing installation 130 at a timing when processing end estimated time and convey-in preparation completion estimated time are synchronized with each other such that preparation for an operation for conveying the next material sheet into the processing machine 136 is completed at estimated time at which processing end of a material sheet which is being processed by the processing machine 136.

More specifically, the production management apparatus 110 is designed to give the processing schedule of the next material sheet at time ("m minutes before the processing end estimated time") obtained by calculating back time required for delivery of the next material sheet estimated, with reference to past records, from the processing end estimated time calculated by the processing time simulation function with respect to the material sheet which is being processed.

The operation of the embodiment described above will be described below with reference to tables shown in FIGS. 3 to 9.

The production management unit 111 of the production management apparatus 110 generates a necessary manufacturing designation on the basis of a production management. The manufacturing designation is expressed by, for example, "Five parts P1, six parts P2, two parts P3, and one part P4 will be manufactured by a laser processing machine until a delivery date: September 20". The table shown in FIG. 3 expresses the manufacturing designation.

On the basis of the manufacturing designation, process scheduler (progress management) 112 generates a processing schedule through a blank layout process and a CAM process performed by the dynamic nesting & CAM processing unit 113.

More specifically, as shown in FIG. 4, the types (materials, thicknesses, sizes, and the like) of material sheets to be used, the necessary number of material sheets, and a processing machine (for example, #1 laser) are decided to determine a processing schedule.

As shown in FIG. 5, the determined processing schedule is divided in each unit of material sheets, so that a processing schedule for each material sheet is completed on the basis of the manufacturing designation.

First, when a processing schedule of the first material sheet S1-1 is transmitted from the job controller 114 to the controller 131, the controller 131 of the sheet-metal factory processing installation 130 reserves the #1 laser processing machine 136 according to the processing schedule and causes the processing machine 136 to perform a processing of the first material sheet S1-1 in cooperation with the peripheral device 140.

The first material sheet S1-1 is delivered from the material storage 141 and conveyed toward the loading/unloading shuttle 145 through the loading buffer 143. The moment the loading buffer 143 becomes empty, the controller 131 transmits the next schedule request to the job controller 114.

When the job controller 114 receives the schedule request, the production management apparatus 110 transmits a processing schedule of a second material sheet S1-2 from the job controller 114 to the controller 131 at a timing when processing end estimated time of the first material sheet S1-1 is synchronized with convey-in preparation completion estimated time of the second material sheet S1-2.

In response to the processing schedule, the controller 131 of the sheet metal factory processing installation 130 reserves the #1 laser processing machine 136 according to the processing schedule and causes the #1 laser processing machine 136 to perform a sheet processing of the second material sheet S1-2 in cooperation with the peripheral device 140.

Figures 6, 7:
FIG. 6 is a table showing a reserved actual result of the processing schedule.
FIG. 7 is a table showing an example of an additional manufacturing designation.

The states of a processing schedules managed by the process scheduler (progress management) 112 are shown in FIG. 6. More specifically, when reserving states are considered, the first and second material sheets S1-1 and S1-2 have been reserved, and the third and the subsequent material sheets S1-3, . . . are not processed.

In this state, when the production management unit 111 of the production management apparatus 110 changes (including addition) a present manufacturing designation on the basis of the production management, i.e., for example, when a manufacturing designation given by "Four parts P5 will be manufactured by a laser processing machine until a delivery date: September 20." is added, as shown in FIG. 7, a new manufacturing designation for the part P5 is added to the current manufacturing designation (see FIG. 3) for the parts P1 to P4 to regenerate a manufacturing designation.

On the basis of the regenerated manufacturing designation and a progress state of the processing schedule at the present, the process scheduler (progress management) 112 obtains a blank layout process and a CAM process performed by the dynamic nesting & CAM processing unit 113 to regenerate a processing schedule.

More specifically, as shown in FIG. 7 with respect to the additional manufacturing designation given by "Four parts P5 will be manufactured by a laser processing machine until a delivery date: September 20", the types of material sheets to be used, the necessary number of material sheets, and a processing machine are determined. The manufacturing designation is integrated with an unexecuted processing schedule shown in FIG. 6 to determine, as shown in FIG. 8, a processing schedule required after the present time in the regenerated manufacturing designation.

As shown in FIG. 9, below the table of the reserved material sheets S1-1 to S1-2 until the present time, the determined processing schedule is divided in each unit of material sheets, so that a processing schedule for each material sheet required after the present time can be completed on the basis of the regenerated manufacturing designation.

When the job controller 114 receives the next schedule request from the controller 131, the production management apparatus 110 transmits a processing schedule of the third material sheet S3-1 from the job controller 114 to the controller 131 at a timing when processing end estimated time of the second material sheet S1-2 is synchronized with a convey-in preparation completion estimated time of the third material sheet S3-1.

In response to the processing schedule, the controller 131 of the sheet metal factory processing installation 130 reserves the #1 laser processing machine 136 according to the processing schedule and causes the #1 laser processing machine 136 to perform a sheet processing of the third material sheet S3-1 in cooperation with the peripheral device 140.

Similarly, when a sheet processing of a final material sheet S5-1 is ended, all required sheet metal factory processings (sheet processings) based on the current manufacturing designation (see FIG. 7) including halfway addition are ended.

As described above, in the sheet metal factory processing system 101, the process scheduler (progress management) 112 of the production management apparatus 110 manages processing schedules based on the manufacturing designation in each unit of material sheets. Furthermore, even though the production management apparatus 110 receives the next schedule request from the controller 131 of the sheet metal factory processing installation 130, the production management apparatus 110 does not respond to the schedule request without condition. More specifically, the production management apparatus 110 transmits the processing schedule of the next material sheet to the controller 131 at a timing (m minutes before processing end estimated time) when processing end estimated time of the preceding material sheet is synchronized with convey-in preparation completion estimated time of the next material sheet.

For this reason, the sheet metal factory processing system 101 can flexibly cope with an interrupt processing schedule generated at various timings and on various conditions. These various interrupt functions will be described below with reference to schematic layout diagrams shown in FIGS. 10 to 16.

Figure 10:
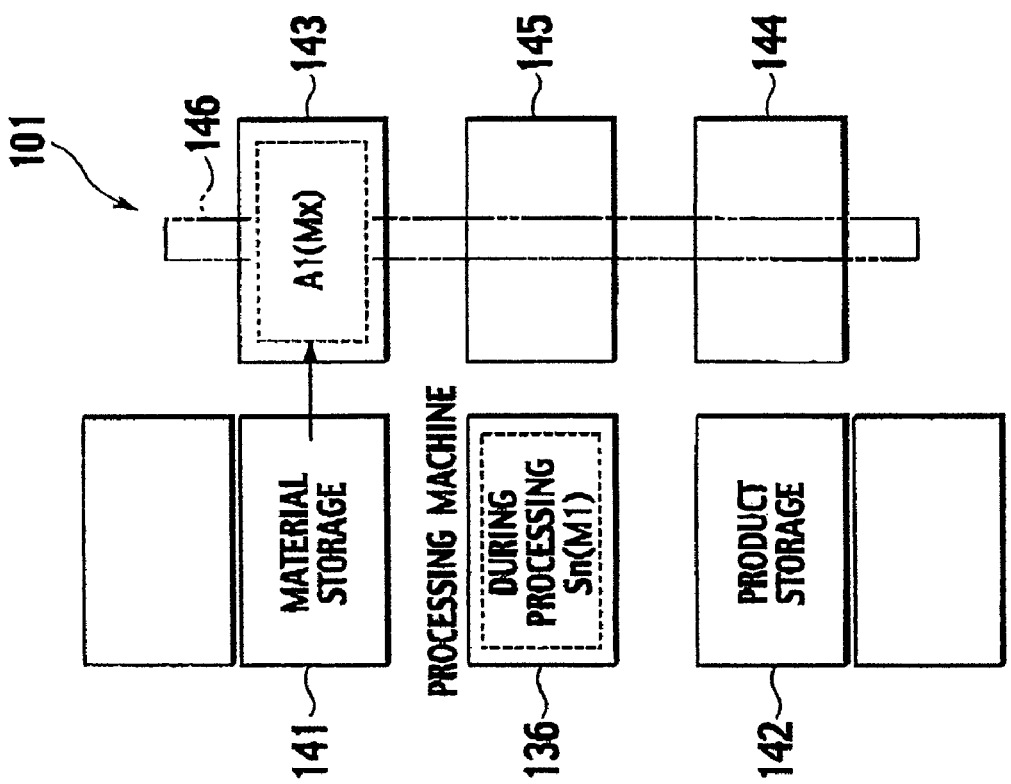
FIG. 10 is a schematic layout diagram showing a first example of an interrupt function in the sheet metal factory processing system in FIG. 1.

FIG. 10 shows a first example of the interrupt function of the sheet metal factory processing system 101. In this example, when an interrupt processing schedule is generated in processing of the nth material sheet Sn (material and thickness M1), if a timing of the generation is set before "m minutes before the processing end estimated time" of a material sheet Sn, the interrupt processing schedule can be executed regardless of the material and the thickness Mx, even though the interrupt processing schedule is one of the interrupt processing schedule A1.

In this manner, an automatic operation can be continued without stopping the sheet metal factory processing installation 130 including the #1 laser processing machine 136.

Figure 11:
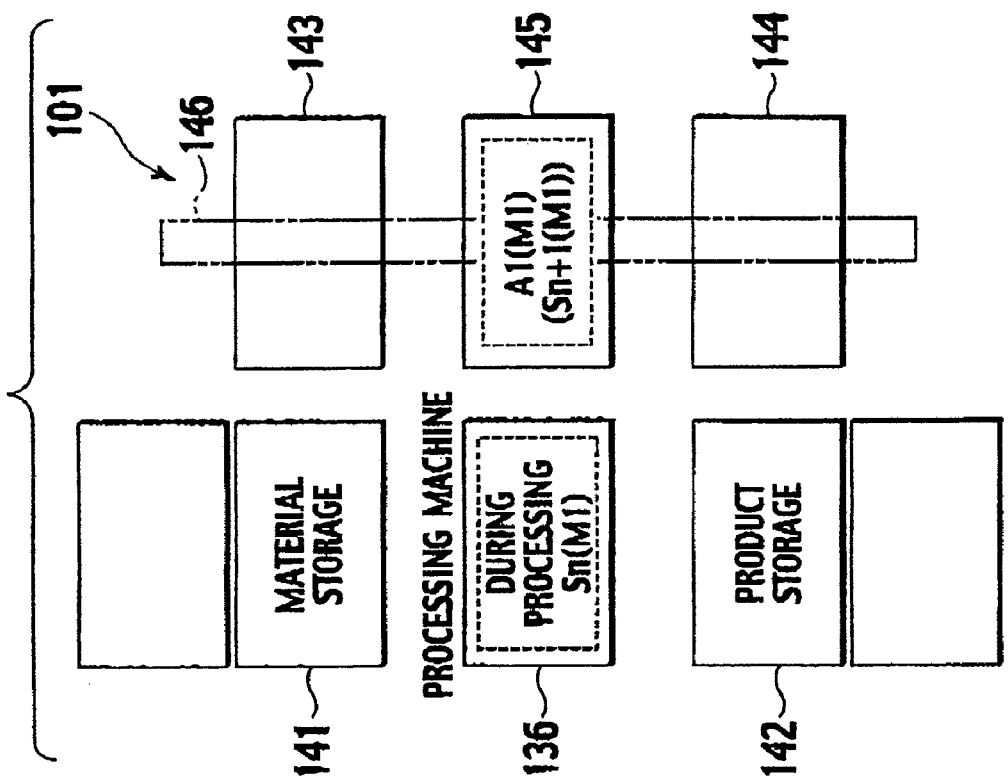
FIG. 11 is a schematic layout diagram showing a second example of the interrupt function in the sheet metal factory processing system in FIG. 1.

FIG. 11 shows a second example of the interrupt function of the sheet metal factory processing system 101. This example explains the following case. That is, when an interrupt processing schedule is generated in the duration of "m minutes before the processing end estimated time" of an nth material sheet Sn (material and thickness M1), a material sheet A1 used in the interrupt processing schedule has a material and a thickness M1 which are the same as those of an (n+1)th material sheet Sn+1 (material and thickness M1).

In this case, interrupt processing schedule data of the material sheet A1 is dynamically nested in the material sheet Sn+1 to make it possible to execute an interrupt processing schedule of the material sheet A1 by using the material sheet Sn+1.

In this manner, the automatic operation can be continued without stopping the sheet metal factory processing installation 130 including the #1 laser processing machine 136.

FIG. 12 shows a third example of the interrupt function of the sheet metal factory processing system 101. This example explains a case in which, when an interrupt processing schedule is generated in the duration of "m minutes before the processing end estimated time" of the nth material sheet Sn (material and thickness M1), the material sheet A1 used in the interrupt processing schedule has a material and a thickness M2 which are different from those of the (n+1)th material sheet Sn+1 (material and thickness M1).

In this case, the material sheet Sn+1 is in waiting in the loading/unloading shuttle 145. By using the single-sheet pickup and conveying device 146, the processed sheet (product) Sn is directly unloaded on the unloading buffer 144. Subsequently, the material sheet A1 is directly loaded from the loading buffer 143 to the #1 laser processing machine 136 by using the single-sheet pickup and conveying device 146 to make it possible to execute an interrupt processing schedule of the material sheet A1.

When a plurality of material sheets A1 are used, the material sheets A1 are sequentially subjected to the processing. In such an interrupt processing schedule, necessary re-nesting is performed first to cancel the processing schedule, which has been used, and a new processing schedule including an unprocessed part is formed.

Upon completion of the interrupt processing schedule, when the next schedule includes processing for a material sheet having the same material and thickness M1 as those of the material sheet Sn+1, the material sheet Sn+1 being in waiting in the loading/unloading shuttle 145 is loaded on the #1 laser processing machine 136 to cause the #1 laser processing machine 136 to execute the processing.

In this manner, the automatic operation can be continued without stopping the sheet metal factory processing installation 130 including the #1 laser processing machine 136.

FIG. 13 shows a fourth example of an interrupt function of the sheet metal factory processing system 101. This example explains a case in which, when an nth material sheet Sn (material and thickness M1) is loaded on the #1 laser processing machine 136 and waits for the start of processing, a special-express interrupt processing schedule A1 (of material and thickness M1) which can use the material sheet Sn is generated.

In this case, special-express interrupt processing schedule data is dynamically nested in the material sheet Sn to make it possible to execute the special-express interrupt processing schedule A1 by using the material sheet Sn.

In this manner, the automatic operation can be continued without stopping the sheet metal factory processing installation 130 including the #1 laser processing machine 136.

Figure 14:
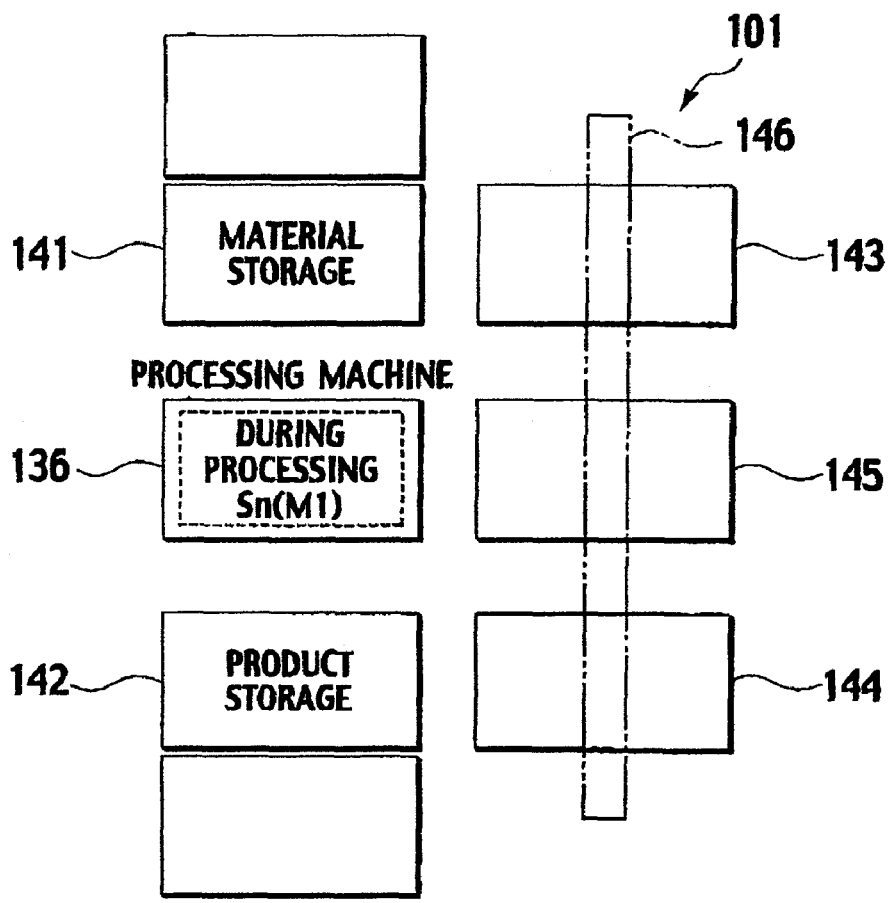
FIG. 14 is a schematic layout diagram showing a fifth example of the interrupt function in the sheet metal factory processing system in FIG. 1.
Figure 15:
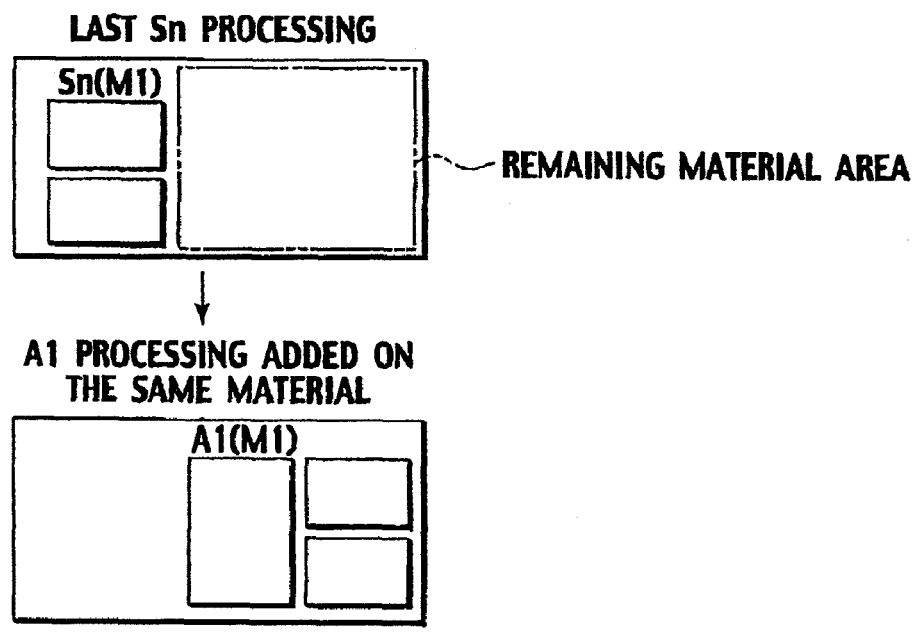
FIG. 15 is a schematic diagram of a material sheet showing a processing example to which the interrupt function in FIG. 14 is applied.

FIG. 14 shows a fifth example of the interrupt function of the sheet metal factory processing system 101. This example explains a case in which, as shown in FIG. 15, in processing of an nth material sheet Sn (material and thickness M1), a forcible interrupt processing schedule A1 (of material and thickness M1) which can be reserved for a remaining material area of the material sheet Sn is generated.

In this case, forcible interrupt processing schedule data is dynamically nested in the remaining material area of the material sheet Sn to make it possible to execute the forcible interrupt processing schedule A1 by using the remaining material area of the material sheet Sn.

In this manner, the automatic operation can be continued without stopping the sheet metal factory processing installation 130 including the #1 laser processing machine 136.

Figure 16:
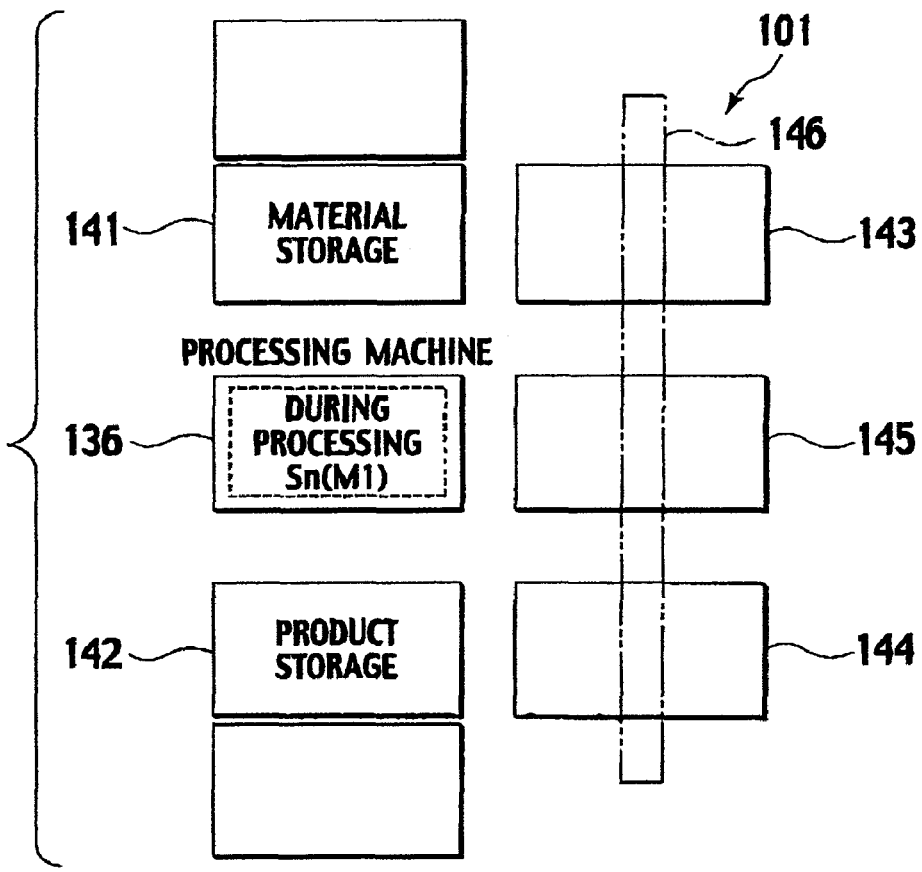
FIG. 16 is a schematic layout diagram showing a sixth example of the interrupt function in the sheet metal factory processing system in FIG. 1.
Figure 17:
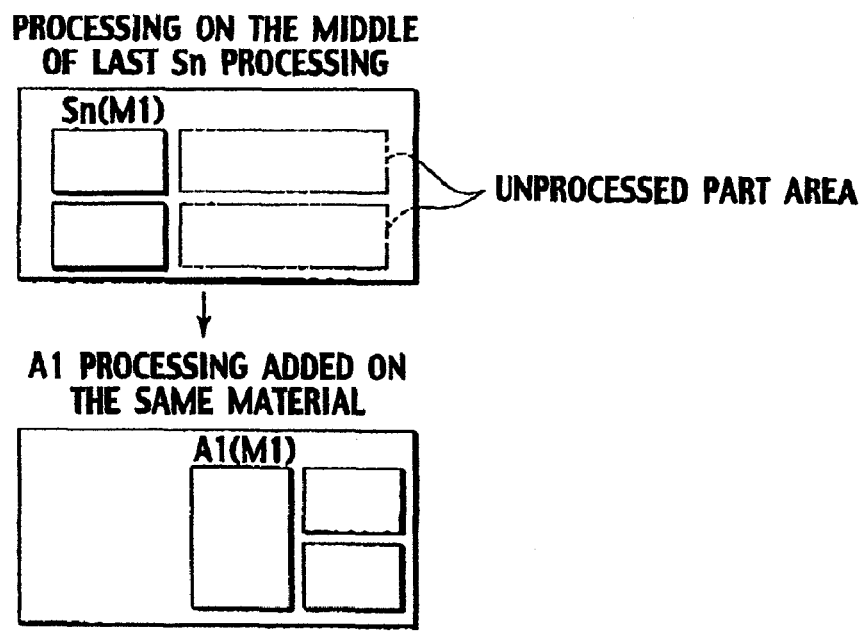
FIG. 17 is a schematic diagram of a material sheet showing a processing example to which the interrupt function in FIG. 16 is applied.

FIG. 16 shows a sixth example of the interrupt function of the sheet metal factory processing system 101. This example explains a case in which, as shown in FIG. 17, in processing of a nth material sheet Sn (material and thickness M1), a forcible interrupt processing schedule A1 (of material and thickness M1) which can be reserved for a unprocessed part area of the material sheet Sn is generated.

In this case, forcible interrupt processing schedule data is dynamically nested in the remaining material area of the material sheet Sn to make it possible to execute the forcible interrupt processing schedule A1 by using the unprocessed part area of the material sheet Sn.

In this manner, the automatic operation can be continued without stopping the sheet metal factory processing installation 130 including the #1 laser processing machine 136.

The explanation about the configurations, operations, and interrupt functions of the sheet metal factory processing system 101 is not limited to the sheet metal factory processing system 101 including only one sheet metal factory processing installation 130 as shown in FIG. 1.

More specifically, for example, the explanation about the configurations, operations, and interrupt functions of the above described sheet metal factory processing system 101 can also be applied to a sheet metal factory processing system including a plurality of sheet metal factory processing installation cells each of which is configured by using the sheet metal factory processing installation such as the sheet metal factory processing installation 130 shown in FIG. 1 as a cell.

Furthermore, for example, the explanation about the configurations, operations, and interrupt functions of the above described sheet metal factory processing system 101 can also be applied to a sheet metal factory processing system in which one sheet metal factory processing installation has a plurality of processing machines and a plurality of peripheral devices.

In addition, the sheet metal factory processing installation cell is not limited to an installation, which receives a material from storage and stores a processed product in the storage. More specifically, for example, the explanation about the sheet metal factory processing system 101 can be basically applied to a sheet metal factory processing installation cell having an independent manipulator for conveying in/out a material in the cell or a sheet metal factory processing installation cell in which a material is manually conveyed in/our without a peripheral device by additionally arranging a controller 131 in the cell.

Figure 18:
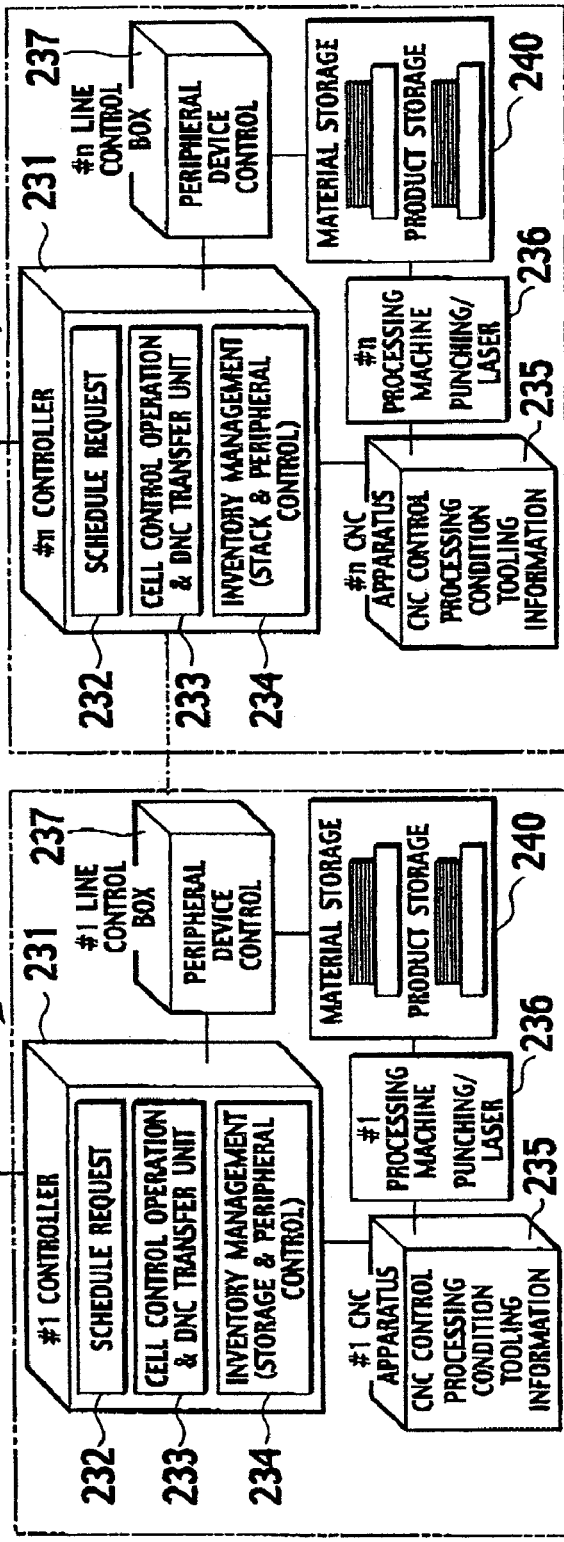
FIG. 18 is a schematic block diagram showing a second embodiment of a sheet metal factory processing system according to the invention.

FIG. 18 is a schematic block diagram showing a second embodiment of the sheet metal factory processing system according to the invention. The sheet metal factory processing system 201 is formed by connecting a production management apparatus 210 and a plurality of sheet metal factory processing installations (sheet metal factory processing installation cells) 230 (#1 to #n) to a network 220.

The configuration of the production management apparatus 210 and the configuration of each sheet metal factory processing installations 230 are the same as those of the production management apparatus 110 and the sheet metal factory processing installation 130 in the sheet metal factory processing system 101 shown in FIG. 1. Therefore, the same reference numerals as in FIG. 1 denote the same parts in FIG.

18, and a detailed description thereof will be omitted such that a number 100 is added to the same reference numbers used in FIG. 1 each.

All the sheet metal factory processing installations 230 (#1 to #n) are independently arranged. More specifically, the sheet metal factory processing installations 230 independently communicate with the production management apparatus 210, cause controllers 231 to transmit schedule requests, and receive processing schedule from the production management apparatus 210. The sheet metal factory processing installations 230 can perform sheet processing according to the processing schedule.

The production management apparatus 210 can independently communicate with the entire sheet metal factory processing installations 230 (#1 to #n) and independently give processing schedules in response to the schedule requests from the sheet metal factory processing installations 230 to make it possible to execute the processing schedule.

However, since the production management apparatus 210 is connected to the plurality of sheet metal factory processing installations 230 (#1 to #n), for example, when a fault occurs in processing one (#") of the sheet metal factory processing installations 230, a processing schedule to be performed in the sheet metal factory processing installation 230 (#") can be executed in another sheet metal factory processing installation 230 (#''').

In this manner, a stop (waiting) time in the entire system can be shortened to make it possible to improve the operating rate and the production efficiency of the system.

The production management apparatus 210 can generate a manufacturing designation, which handles at least two sheet metal factory processing installations 230 as a group on the basis of production management. On the manufacturing designation, the production management apparatus 210 can generate a processing schedule which is reserved to the sheet metal factory processing installation groups 230.

With respect to the processing schedule which is reserved for the sheet metal factory processing installation groups 230, optimum scheduling is performed depending on the progress of the schedules of the sheet metal factory processing installations 230 in each group, so that a stop (waiting) time in each group is shortened to make it possible to improve the operating rate and the production efficiency of the system.

An operation of the embodiment will be described below with reference to flow charts shown in FIGS. 19 to 34.

Figure 19:
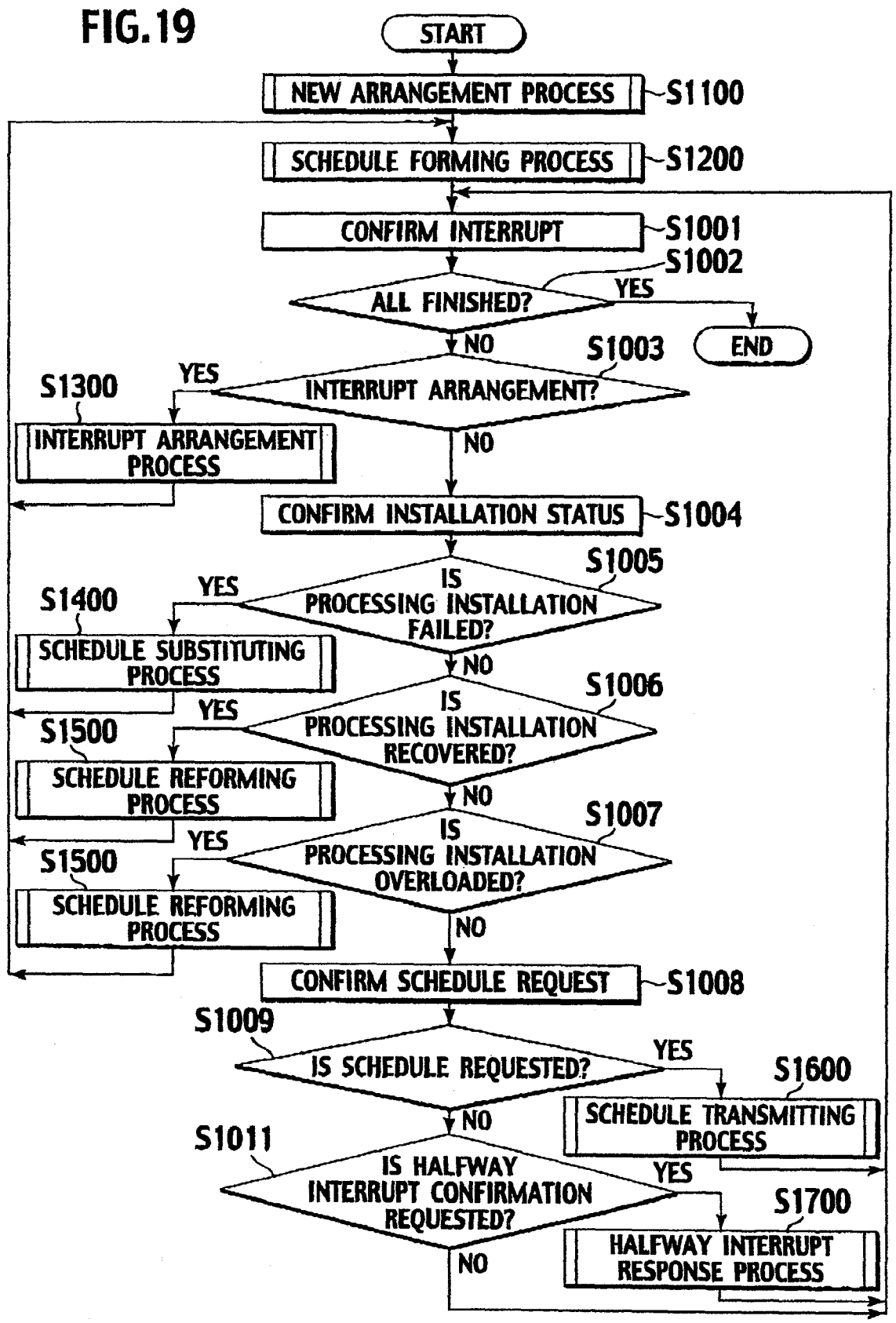
FIG. 19 is a flow chart showing an operation of a job controller in the sheet metal factory processing system in FIG. 18.

FIG. 19 shows a flow chart of a job controller 214 of the production management apparatus 210. The job controller 214 is activated when the production management apparatus 210 is powered on. The job controller 214 always monitors a manufacturing arrangement and an interrupt arrangements from a production management unit 211, schedule requests from the controllers 231 of the connected sheet metal factory processing installations 230, and installation statuses of the sheet metal factory processing installations 230.

As shown in FIG. 19, the job controller 214 executes a new arrangement process (step S1100) first.

Next, the job controller 214 executes a schedule forming process (Step S1200).

The job controller 214 makes interrupt confirmation (step S1001). Subsequently, the job controller 214 decides all the processes are finished (step S1002). When all the processes are finished (YES in step S1002), the flow is ended.

On the other hand, all the processes are not finished (No in step S1002), the job controller 214 decides whether interrupt arrangement is set (step S1003).

When the interrupt arrangement is set (YES in step S1003), the job controller 214 executes an interrupt arrangement process (step S1300). Thereafter, the job controller 214 returns to the "schedule forming process" in step S1200.

On the other hand, when the interrupt arrangement is not set (NO in step S1003), the job controller 214 confirms the installation statuses of the sheet metal factory processing installations 230 (#1 to #n) (step S1004). Subsequently, the job controller 214 decides whether the sheet metal factory processing installations 230 are failed (step S1005).

When the sheet metal factory processing installations 230 are failed (YES in step S1005), the job controller 214 executes a schedule substituting process (step S1400). Thereafter, the job controller 214 returns to the "schedule forming process" in step S1200.

On the other hand, when the sheet metal factory processing installations 230 are not failed (NO in step S1005), the job controller 214 continuously decides whether the sheet metal factory processing installations 230 are recovered (step S1006).

When the sheet metal factory processing installations 230 are recovered (YES in step S1006), the job controller 214 executes a schedule reforming process (step S1500). Thereafter, the job controller 214 returns to the "schedule forming process" in step S1200.

On the other hand, when the sheet metal factory processing installations 230 are not recovered (NO in step S1006), the job controller 214 continuously decides whether the sheet metal factory processing installations 230 are overloaded (step S1007).

When the sheet metal factory processing installations 230 are overloaded (YES in step S1007), the job controller 214 executes the schedule reforming process (step S1500). Thereafter, the job controller 214 returns to the "schedule forming process" in step S1200.

On the other hand, the sheet metal factory processing installations 230 are not overloaded (NO in step S1007), the job controller 214 makes a schedule request confirmation (step S1008). Subsequently, the job controller 214 decides whether a schedule request is made (step S1009).

When the schedule request is made (YES in step S1009), the job controller 214 executes a schedule transmitting process (step S1600). Thereafter, the job controller 214 returns to the "interrupt confirmation" in step S1001.

On the other hand, when the schedule request is not made (NO in step S1009), the job controller 214 continuously decides whether a halfway interrupt confirmation request is made (step S1011).

When the halfway interrupt confirmation request is made (YES in step S1011), the job controller 214 executes a halfway interrupt response process (step S1700). Thereafter, the job controller 214 returns to the "interrupt confirmation" in step S1001.

On the other hand, when the halfway interrupt confirmation request is not made (NO in step S1011), the job controller 214 returns to the interrupt confirmation in step S1001.

Figure 20:
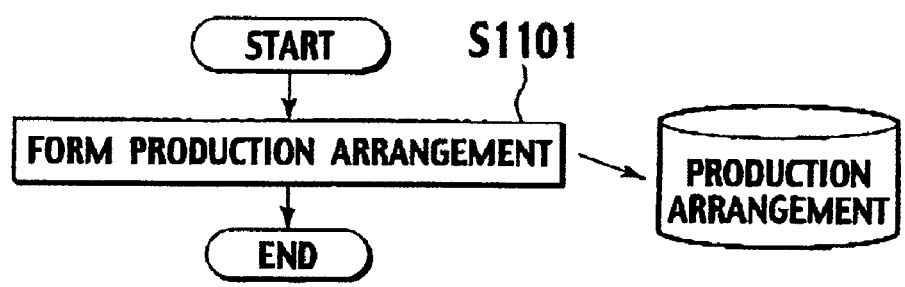
FIG. 20 is a flow chart showing an operation of a new arrangement process in the flow of the job controller.

FIG. 20 is a flow chart of a new arrangement process (step S1100) in the flow of the job controller 214 described above.

As shown in FIG. 20, the new arrangement process forms a manufacturing arrangement (step S1101) and stores the formed manufacturing arrangement.

Figure 21:
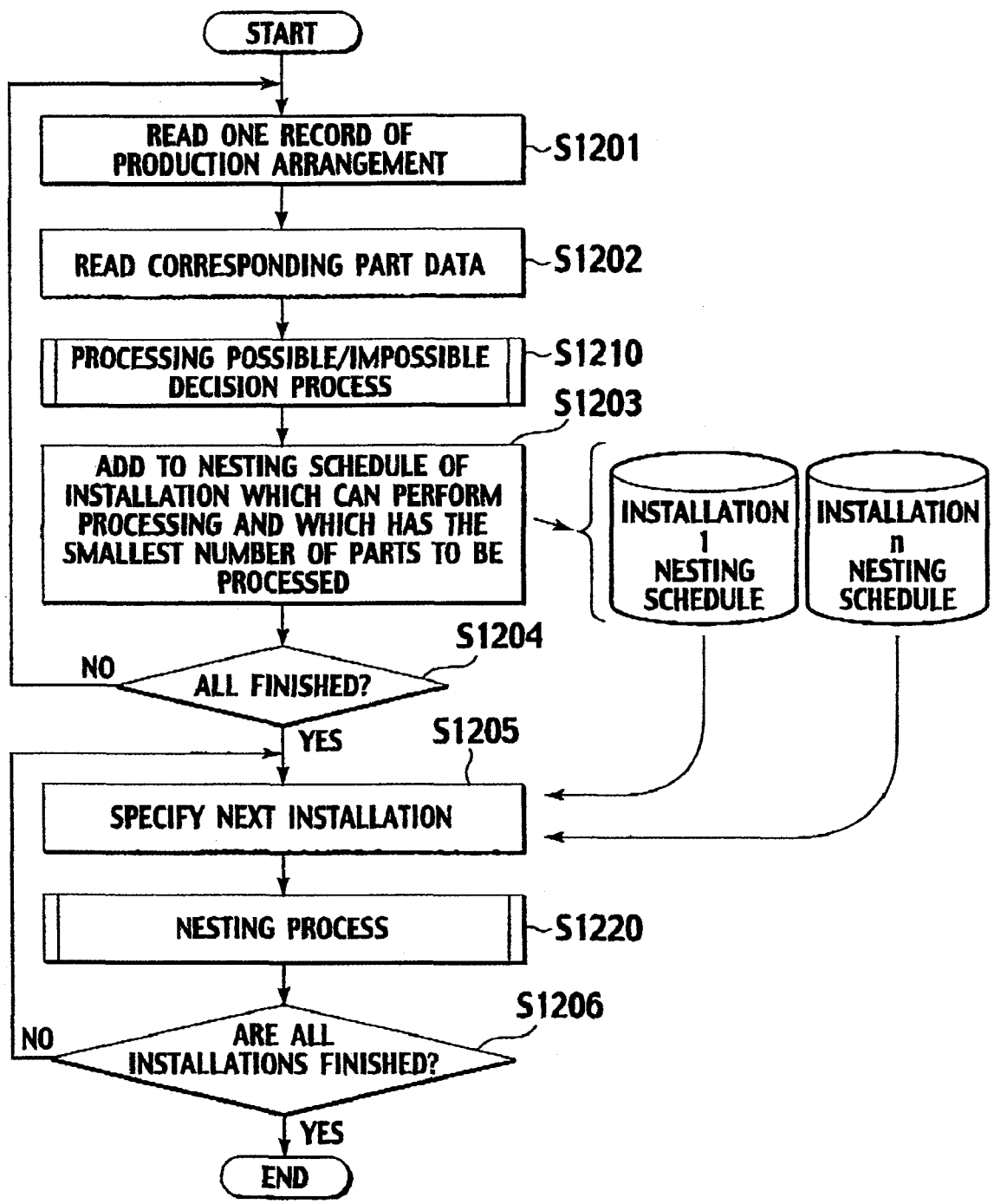
FIG. 21 is a flow chart showing an operation of a schedule forming process in the flow of the job controller.

FIG. 21 is a flow chart of a schedule forming process (step S1200) in the flow of the job controller 214 described above.

As shown in FIG. 21, in the schedule forming process, the job controller 214 reads one record of manufacturing arrangement (step S1201).

In the schedule forming process, the job controller 214 reads the part data (step S31202).

In the schedule forming process, the job controller 214 executes a processing possible/impossible decision process (step S1210).

Subsequently, in the schedule forming process, in order to prevent only a specific sheet metal factory processing installation 230 from being overloaded by processing, job controller 214 adds manufacturing arrangement information to a nesting schedule of the sheet metal factory processing installation 230 which can be processed and has a minimum number of parts to be processed (step S1203).

Subsequently, in the schedule forming process, the job controller 214 decides whether all the processes are finished (step S1204). When all the processes are not finished (NO in step S1204), the job controller 214 returns to the "reading of one record of manufacturing arrangement" in step S1201 to repeat the processes until all the processes are finished.

On the other hand, when all the processes are finished (YES in step S1204), in the schedule forming process, the job controller 214 specifies the next sheet metal factory processing installation (step S1205).

In the schedule forming process, the job controller 214 executes a nesting process (step S1220).

Subsequently, in the schedule forming process, the job controller 214 decides whether the processes in the entire sheet metal factory processing installations 230 (#1 to #n) are finished (step S1206). When the processes in all the sheet metal factory processing installations 230 (#1 to #n) are not finished (NO in step S1206), the job controller 214 returns to the "Specifying of next sheet metal factory processing installation" in step S1205 to repeat the processes until the processes in all the sheet metal factory processing installations 230 (#1 to #n) are finished.

On the other hand, all the sheet metal factory processing installations 230 (#1 to #n) are finished (YES in step S1206), the flow of the schedule forming process is ended.

Figure 22:
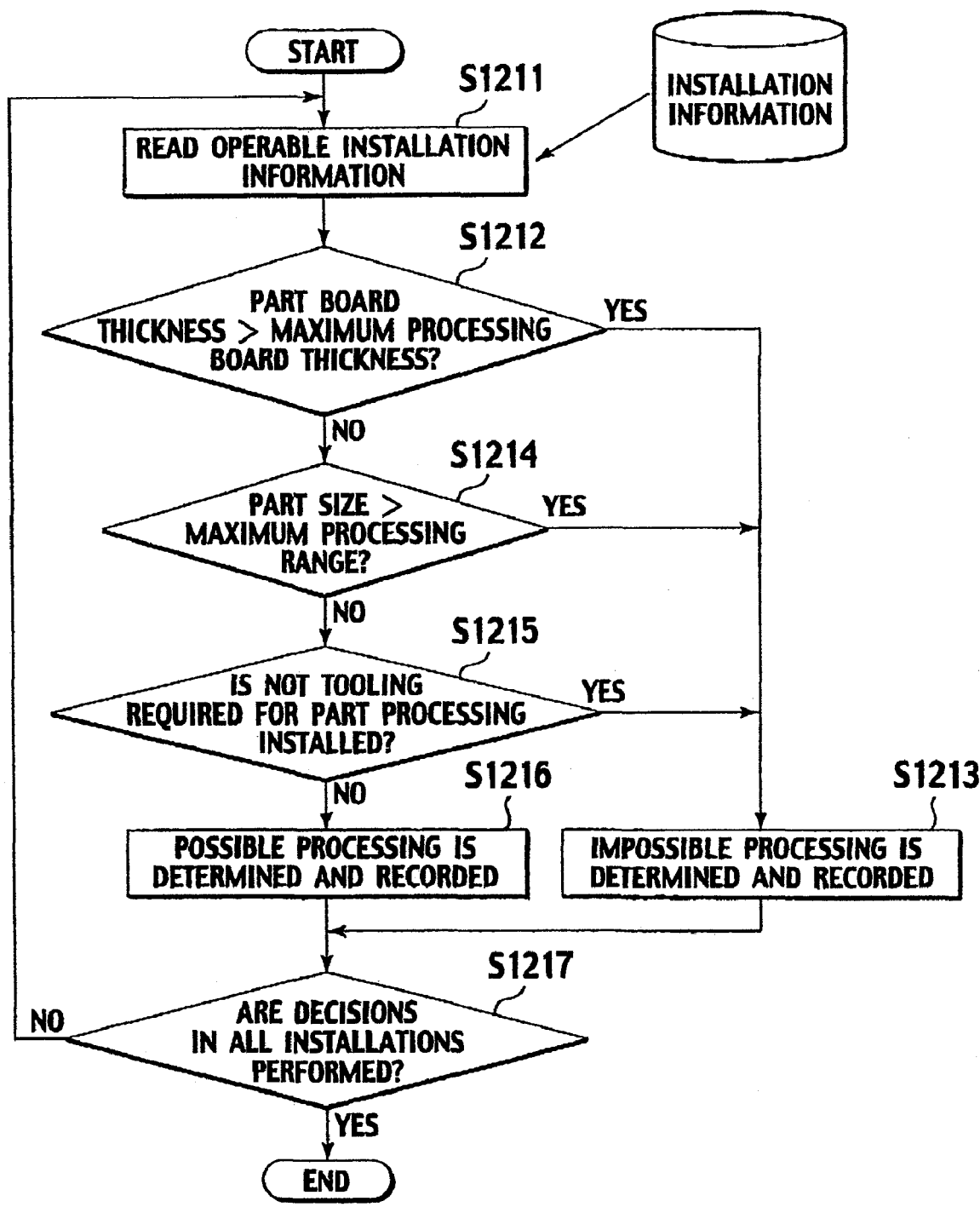
FIG. 22 is a flow chart showing an operation of a processing possible/impossible decision process in the flow of the schedule forming process.

FIG. 22 is a flow chart of a processing possible/impossible decision process (step S1210) in the flow of the schedule forming process described above.

As shown in FIG. 22, in the processing possible/impossible decision process, the job controller 214 reads information of an operable sheet metal factory processing installation (step S1211).

Subsequently, in the processing possible/impossible decision process, the job controller 214 compares the thickness of a part with the maximum processing thickness (step S1212). When the thickness of the part is larger than the maximum processing thickness (YES in step S1212), in the processing possible/impossible decision process, the job controller 214 determines impossible processing and records the result (step S1213).

On the other hand, when the thickness of the part is not larger than the maximum processing thickness (NO in step S1212), the job controller 214 continuously compares a part size (X, Y) with the maximum processing range (step S1214) in the processing possible/impossible decision process. When the part size is larger than the maximum processing range (YES in step S1214), in the processing possible/impossible decision process, the job controller 214 determines impossible process and records the result (step S1213).

On the other hand, when the part size is not larger than the maximum processing range (NO in step S1214), in the processing possible/impossible decision process, the job controller 214 decides whether a tooling required to process the part is arranged (step S1215). When the tooling required to process the part is not arranged (YES in step S1215), in the processing possible/impossible decision process, the job controller 214 determines impossible processing and records the result (step S1213).

On the other hand, when the tooling required to process the part is arranged (NO in step S1215), in the processing possible/impossible decision process, the job controller 214 determines possible processing and records the result (step S1216).

Subsequently, in the processing possible/impossible decision process, the job controller 214 decides whether the processes for the entire sheet metal factory processing installations are finished (step S1217). When the processes for all the installations are nor finished (NO in step S1217) the job controller 214 returns to the "reading of information of operable sheet metal factory processing installation" in step S1211 to repeat the processes until the processes for all the installations are ended.

On the other hand, when the processes for all the installations are finished (YES in step S1217), the flow of the processing possible/impossible decision process is ended.

Figure 23:
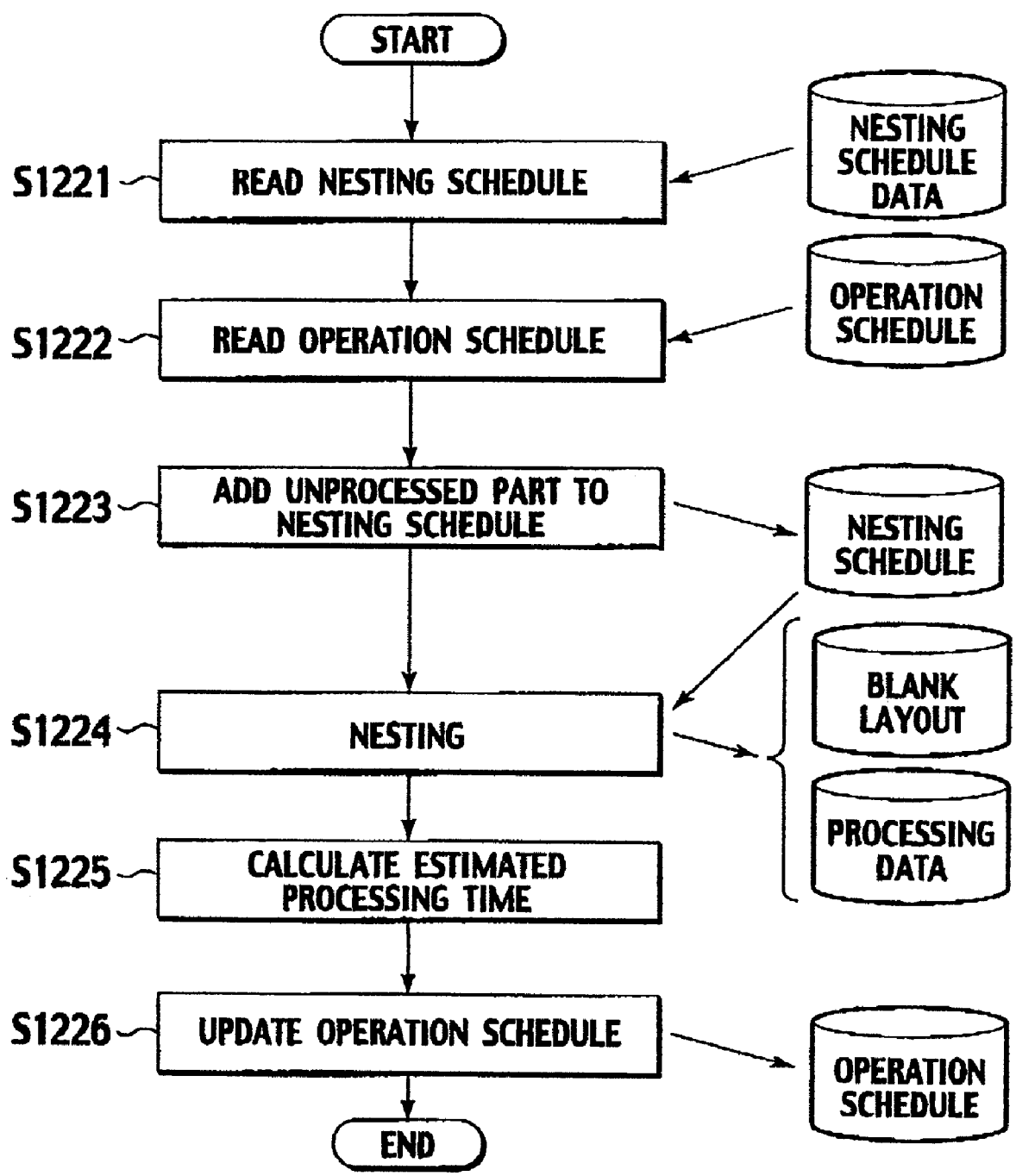
FIG. 23 is a flow chart showing an operation of a nesting process in the flow of the schedule forming process.

FIG. 23 is a flow chart of a nesting process (step S1220) in the flow of the schedule forming process described above.

As shown in FIG. 23, in the nesting process, the job controller 214 reads a nesting schedule first (step S1221).

In the nesting process, the job controller 214 reads an operation schedule (step S1222).

In the nesting process, the job controller 214 adds an unprocessed part in the read operation schedule to the nesting schedule (step S1223).

In the nesting process, the job controller 214 performs nesting (step S1224).

In the nesting process, the job controller 214 calculates an estimated processing time (step S1225).

Finally, in the nesting process, the job controller 214 updates the operation schedule (step S1226).

Figure 24:
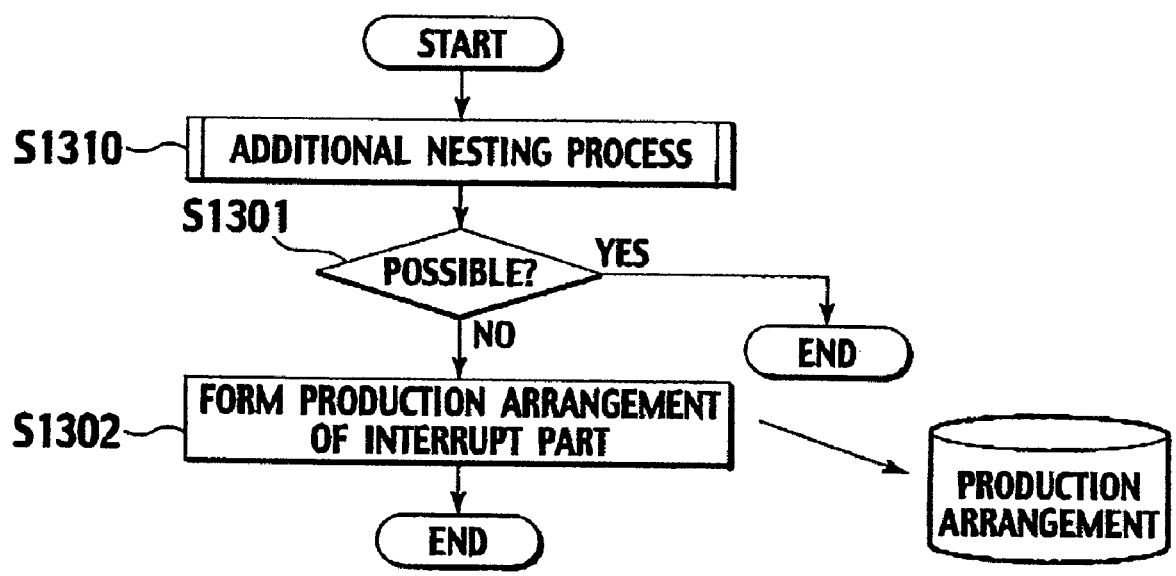
FIG. 24 is a flow chart showing an operation of an interrupt arrangement process in the flow of the job controller.

FIG. 24 is a flow chart of an interrupt arrangement process (step S1300) in the flow of the job controller 214 described above.

As shown in FIG. 24, an the interrupt arrangement process, the job controller 214 executes an additional nesting process (step S1310). The additional nesting process is shown in FIG. 25.

Figure 25:
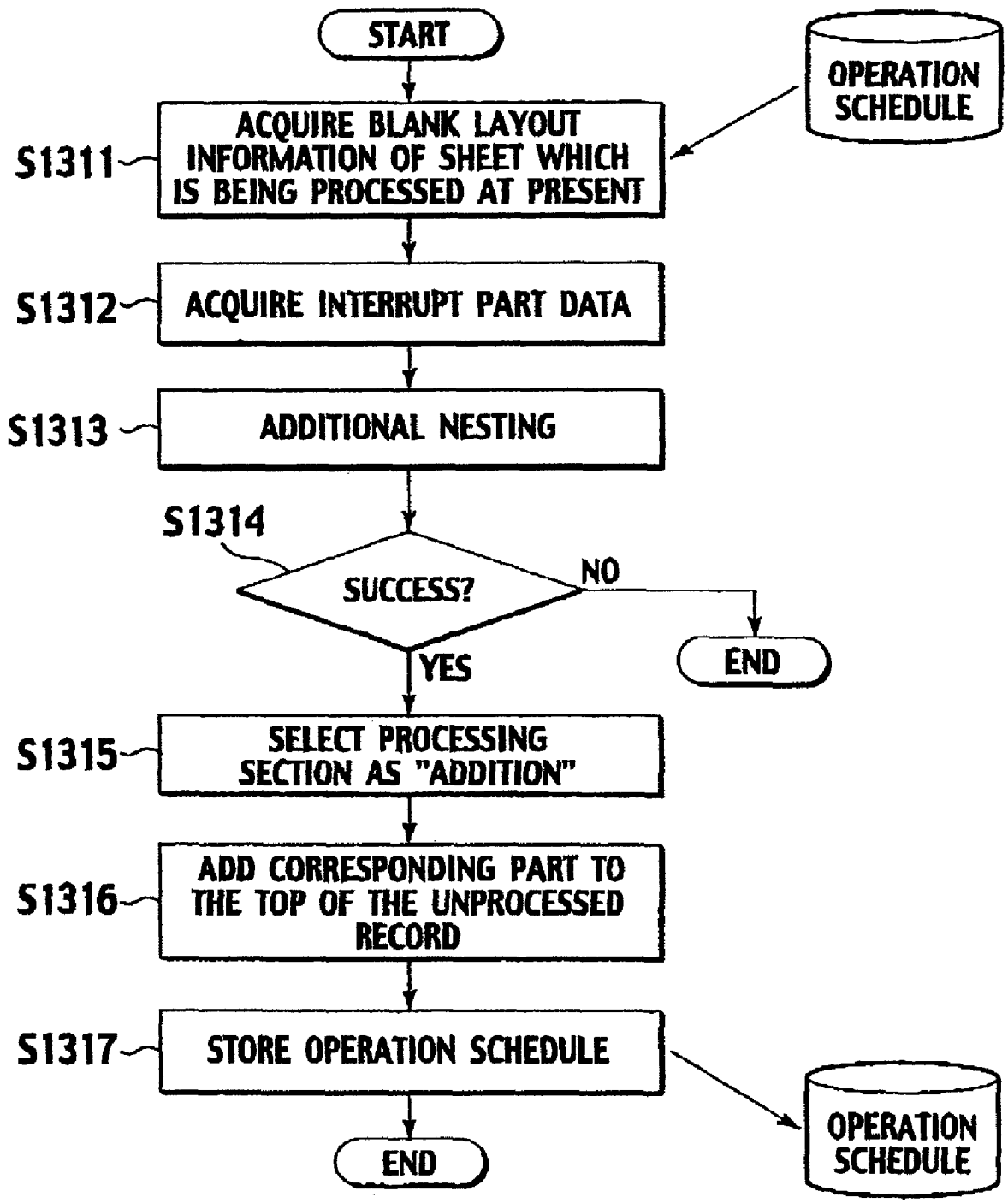
FIG. 25 is a flow chart showing an operation of an additional nesting process in the flow of the interrupt arrangement process.

As shown in FIG. 25, in the additional nesting process, the job controller 214 acquires blank layout information of a sheet, which is being processed at present (step S1311).

In the additional nesting process, the job controller 214 acquires interrupt part data (step S1312).

In the additional nesting process, the job controller 214 performs additional nesting (step S1313). The additional nesting includes the following operations. That is, for example, as shown in FIG. 15, an arrangement position of an additional part is determined to perform blank layout of the part in a blank of a processed sheet and to process the part, and processing data is formed.

Subsequently, in the additional nesting process, the job controller 214 decides whether the additional nesting is succeeded (step S1314). When the additional nesting is not succeeded (NO in step S1314), the job controller 214 ends the additional nesting process.

On the other hand, when the additional nesting is succeeded (YES in step S1314), in the additional nesting process, the job controller 214 selects a processing section as "addition" (step S1315).

In the additional nesting process, the job controller 214 adds the corresponding part to an unprocessed forehead record (step S1316).

In the additional nesting process, the job controller 214 stores the operation schedule (step S1317). The job controller 214 ends the additional nesting process.

Returning to FIG. 24, in the interrupt arrangement process, the job controller 214 decides whether the additional nesting process is possible (step S1301).

When the additional nesting process is possible (YES in step S1301), the interrupt arrangement process is ended.

On the other hand, when the additional nesting process is impossible (NO in step S1301), in the interrupt arrangement process, the job controller 214 forms a manufacturing arrangement including only an interrupt part (step S1302). The job controller 214 stores the formed manufacturing arrangement.

Figure 26:
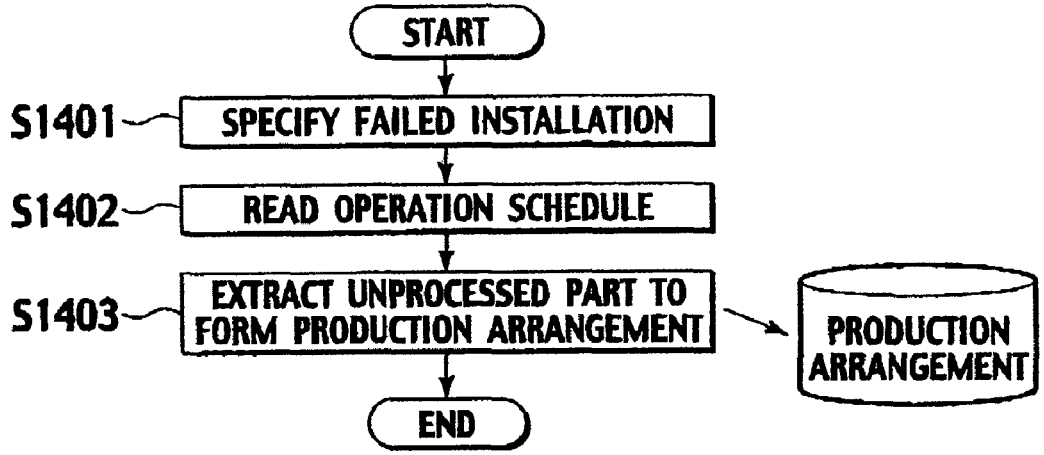
FIG. 26 is a flow chart showing an operation of a schedule substituting process in the flow of the job controller.

FIG. 26 is a flow chart of a schedule substituting process (step S1400) in the flow of the job controller 214 described above.

As shown in FIG. 26, in the schedule substituting process, the job controller 214 specifies a failed sheet metal factory processing installation (step S1401).

In the schedule substituting process, the job controller 214 reads an operation schedule on the job controller 214 side (step S1402).

In the schedule substituting process, the job controller 214 performs extraction of an unprocessed part and formation of a manufacturing arrangement (step S1403). The job controller 214 stores the formed manufacturing arrangement.

Figure 27:
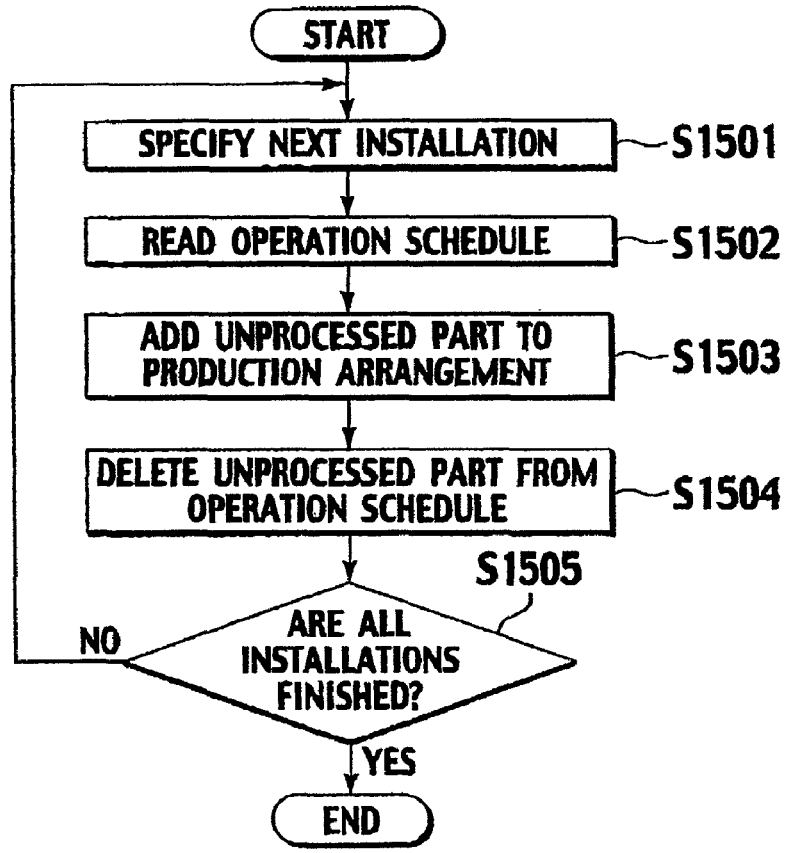
FIG. 27 is a flow chart showing an operation of a schedule reforming process in the flow of the job controller.

FIG. 27 is a flow chart of a schedule reforming process (step S1500) in the flow of the job controller 214 described above.

As shown in FIG. 27, in the schedule reforming process, the job controller 214 specifies the next sheet metal factory processing installation (step S1501).

In the schedule reforming process, the job controller 214 reads an operation schedule (step S1502).

In the schedule reforming process, the job controller 214 adds an unprocessed part to the manufacturing arrangement (step S1503).

In the schedule reforming process, the job controller 214 deletes the unprocessed part from the operation schedule (step S1504).

Subsequently, in the schedule reforming process, the job controller 214 decides whether the processes for the entire sheet metal factory processing installations are finished (step S1505). When the processes for all the sheet metal factory processing installations are not finished (NO in step S1505), the job controller 214 returns to the "specifying of the next sheet metal factory processing installation" in step S1501 to repeat the processes until the processes for all the sheet metal factory processing installations are finished.

On the other hand, the processes for the entire sheet metal factory processing installations are finished (YES in step S1505), the schedule reforming process is ended.

Figure 28:
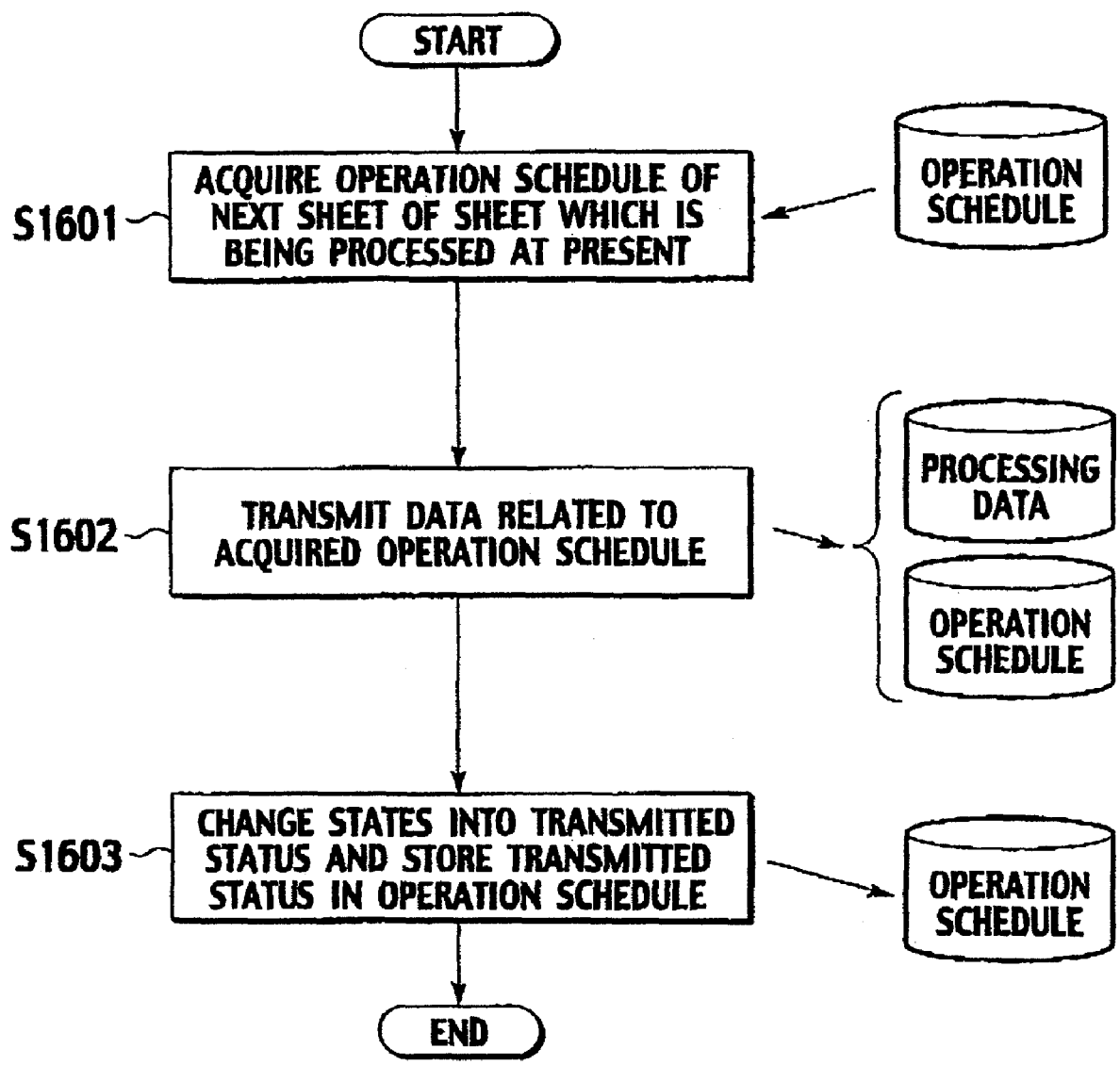
FIG. 28 is a flow chart showing an operation of a schedule transmitting process in the flow of the job controller.

FIG. 28 is a flow chart of a schedule transmitting process (step S1600) in the flow of the job controller 214 described above.

As shown in FIG. 28, in the schedule transmitting process, the job controller 214 acquires an operation schedule of the next sheet, which is being processed at present (step S1601).

In the schedule transmitting process, the job controller 214 transmits data related to the acquired operation schedule to the controller 231 of the sheet metal factory processing installation cell 230 serving as a request source (step S1602). In this case, the data related to the operation schedule includes arrangement data, processing data such as blank layout data, and an operation schedule.

In the schedule transmitting process, the job controller 214 changes the status into a status "transmitted" in the operation schedule and stores the status in the operation schedule (step S1603).

Figure 29:
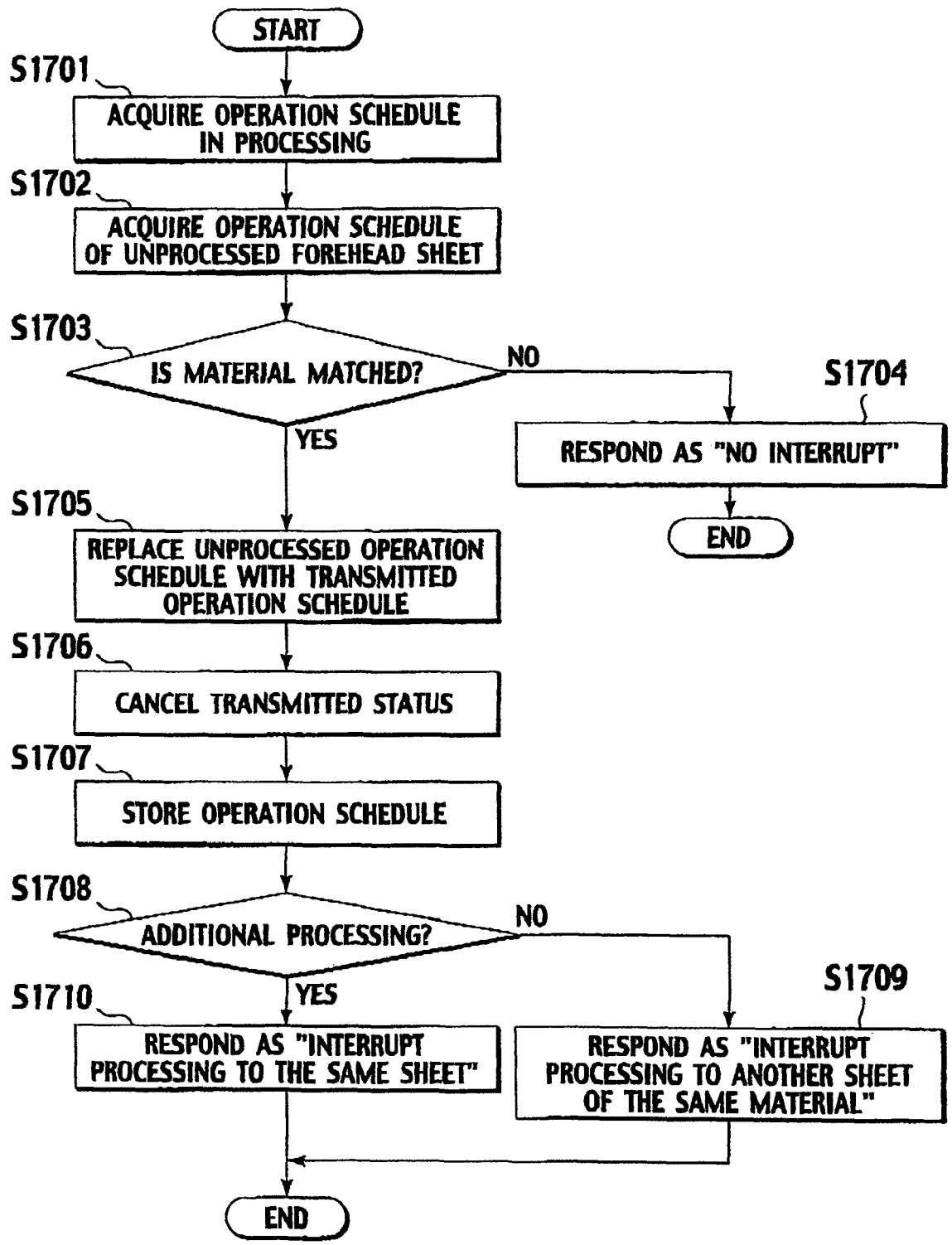
FIG. 29 is a flow chart showing an operation of a halfway interrupt response process in the flow of the job controller.

FIG. 29 is a flow chart of a halfway interrupt response process (step S1700) in the flow of the job controller 214 described above.

As shown in FIG. 29, in the halfway interrupt response process, the job controller 214 acquires an operation schedule under processing (step S1701).

Subsequently, in the halfway interrupt response process, the job controller 214 acquires an unprocessed forehead operation schedule (step S1702).

In the halfway interrupt response process, the job controller 214 decides whether materials are matched with other (step S1703). When the materials are not matched with each other (NO in step S1703), the job controller 214 generates "no interrupt" as a response (step S1704). The job controller 214 ends the halfway interrupt response process.

On the other hand, when the materials are matched with each other (YES in step S1703) in the halfway interrupt response process, the job controller 214 replaces a forehead unprocessed operation schedule with a trailing transmitted operation schedule (step S1705).

In the halfway interrupt response process, the job controller 214 changes the status of the replaced transmitted operation schedule into "unprocessed" (step S1706).

In the halfway interrupt response process, the job controller 214 stores the operation schedule (step S1707).

Subsequently, in the halfway interrupt response process, the job controller 214 decides whether the processing section of the replaced unprocessed operation schedule is additional processing (step S1708). When the processing section is not the additional processing (NO in step S1708), the job controller 214 generates a response as "interrupt processing to another sheet consisting of the same material" (step S1709). The job controller 214 ends the halfway interrupt response process.

On the other hand, when the processing section is the additional processing (YES in step S1708), the job controller 214 generates "interrupt processing to the same sheet" as a response (step S1710). The job controller 214 ends the halfway interrupt response process.

Figure 30:
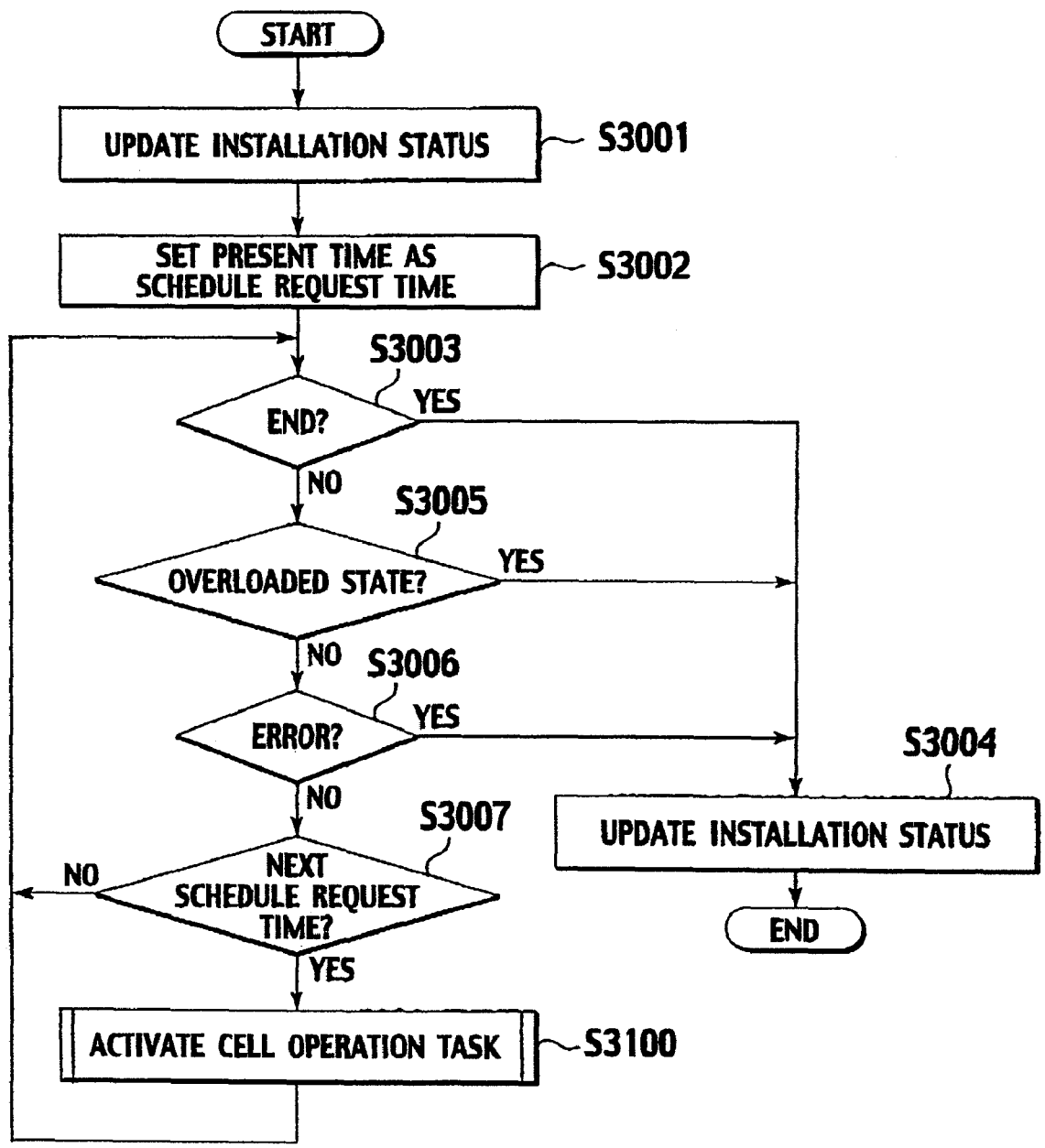
FIG. 30 is a flow chart showing an operation of cell controller in the sheet metal factory processing system in FIG. 18.

FIG. 30 is a flow chart of the controller (cell controller) 231 of an arbitrary sheet metal factory processing installation (sheet metal factory processing installation cell) 230.

The cell controller 231 always monitors a state of the sheet metal factory processing installation cell 230 according to the flow chart in FIG. 30 and activates a cell operation task for performing a cell operation process. For this reason, the cell operation task and the processes in the flow chart are simultaneously performed in parallel with each other (multitask operation).

As shown in FIG. 30, the cell controller 231 sets an installation status of the sheet metal factory processing installation cell 230 as "prepared" (step S3001).

The cell controller 231 sets the present time of the sheet metal factory processing installation cell 230 as schedule request time (step S3002).

Subsequently, the cell controller 231 decides whether the processing schedule is ended with reference to internal information of the sheet metal factory processing installation cell 230 (step S3003). When the processing schedule is ended (YES in step S3003), the cell controller 231 updates the installation status of the sheet metal factory processing installation cell 230 (step S3004) and ends the process.

On the other hand, when the processing schedule is not ended (NO in step S3003), the cell controller 231 continuously decides whether the sheet metal factory processing installation cell 230 is over loaded with reference to the internal information of the sheet metal factory processing installation cell 230 (step S3005). When the sheet metal factory processing installation cell 230 is overloaded (YES in step S3005), the cell controller 231 updates the installation status of the sheet metal factory processing installation cell 230 (step S3004) and ends the process.

On the other hand, when the sheet metal factory processing installation cell 230 is not overloaded (NO in step S3005), the cell controller 231 continuously decides whether the sheet metal factory processing installation cell 230 is erroneous with reference to the internal information of the sheet metal factory processing installation cell 230 (step S3006). When the sheet metal factory processing installation cell 230 is erroneous (YES in step S3006), the cell controller 231 updates the installation status of the sheet metal factory processing installation cell 230 (step S3004) and ends the process.

On the other hand, when the sheet metal factory processing installation cell 230 is not erroneous (NO in step S3006), the cell controller 231 decides whether it is next schedule request time (step S3007). When it is not the next schedule request time (NO in step S3007), the cell controller 231 returns to the decision "whether the processing schedule is ended" in step S3003 to repeat the processes.

On the other hand, when it is the next schedule request time (YES in step S3007), the cell controller 231 activates a cell operation task (step S3100).

Figure 31:
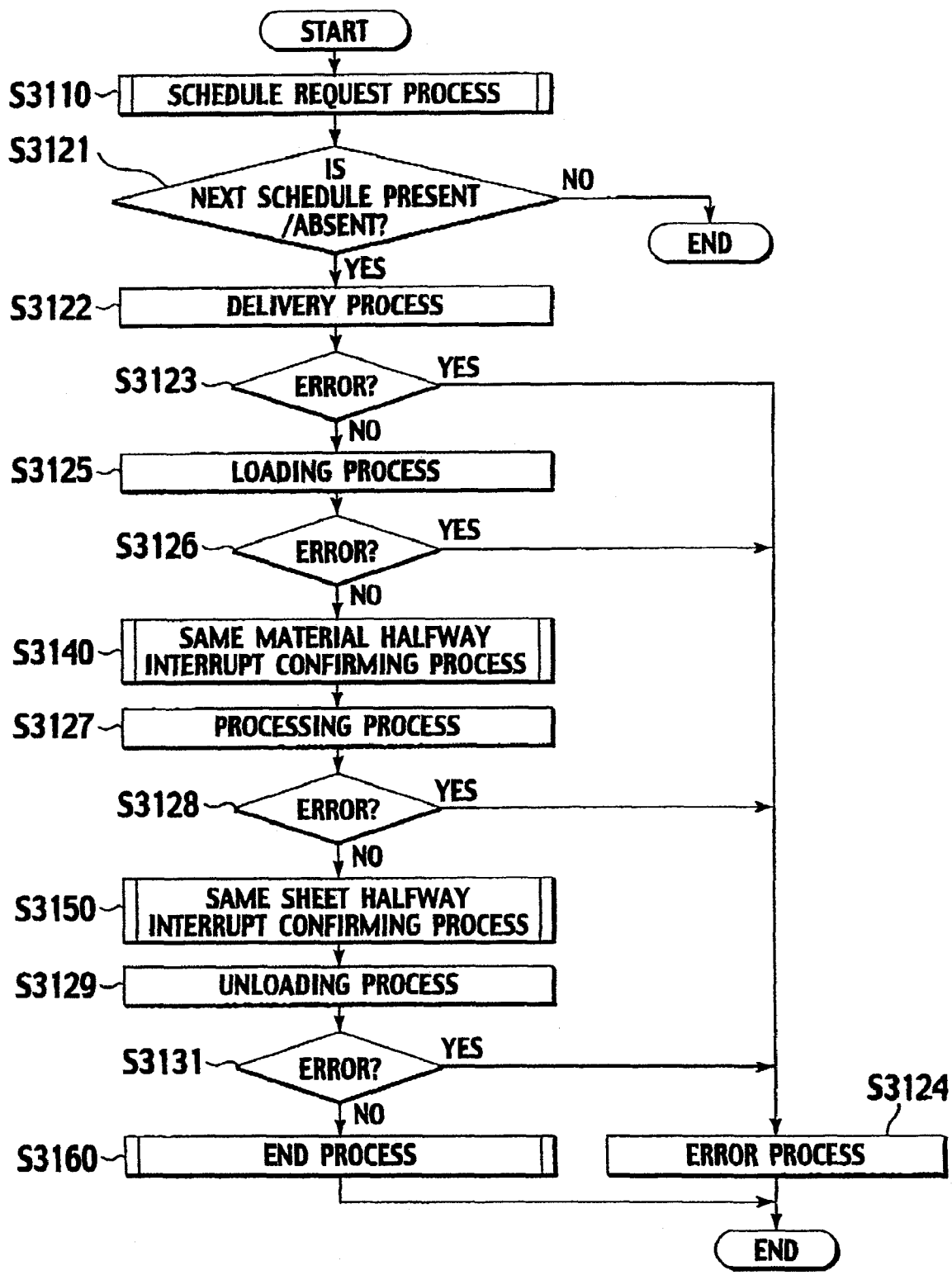
FIG. 31 is a flow chart showing an operation of a cell operation task in the flow of the cell controller.

FIG. 31 is a flow chart of the cell operation task (step S3100) in the flow of the cell controller 231 described above.

As shown in FIG. 31, in the cell operation task, the cell controller 231 executes a schedule request process (step S3110).

In the cell operation task, the cell controller 231 decides whether there is a next schedule (step S3121). When there is no next schedule (NO in step S3121), the cell controller 231 ends the cell operation task.

On the other hand, when there is a next schedule (YES in step S3121), in the cell operation task, the cell controller 231 performs a delivery process (S3122).

Subsequently, in the cell operation task, the cell controller 231 decides whether the delivery process includes an error (step S3123). When the delivery process includes an error (YES in step S3123), in the cell operation task, the cell controller 231 performs an error process (step S3124).

On the other hand, when the delivery process does not include error (NO in step S3123), in the cell operation task, the cell controller 231 performs a loading process (step S3125).

Subsequently, in the cell operation task, the cell controller 231 decides whether the loading process includes an error (step S3126). When the loading process includes an error (YES in step S3126), an the cell operation task, the cell controller 231 performs an error process (step S3124).

On the other hand, when the loading process does not includes an error (NO in step S3126), in the cell operation task, the cell controller 231 executes a same material halfway interrupt confirmation process (step S3140).

In the cell operation task, the cell controller 231 performs a processing process (step S3127).

In the cell operation task, the cell controller 231 decides whether the processing process includes an error (step S3128). When the processing process includes an error (YES in step S3128), in the cell operation task, the cell controller 231 performs an error process (step S3124).

On the other hand, when the processing process does not include an error (NO in step S3128), in the cell operation task, the cell controller 231 executes the same sheet halfway interrupt confirmation process (step S3150).

In the cell operation task, the cell controller 231 performs an unloading process (step S3129).

Subsequently, in the cell operation task, the cell controller 231 decides whether the unloading process includes an error (step S3131). When the unloading process includes an error (YES in step S3131), the cell operation task performs an error process (step S3124).

On the other hand, when the unloading process does not include an error (NO in step S3131), in the cell operation task, the cell controller 231 executes an end process (step S3160). This end process (step S3160) will be described later.

Figure 32:
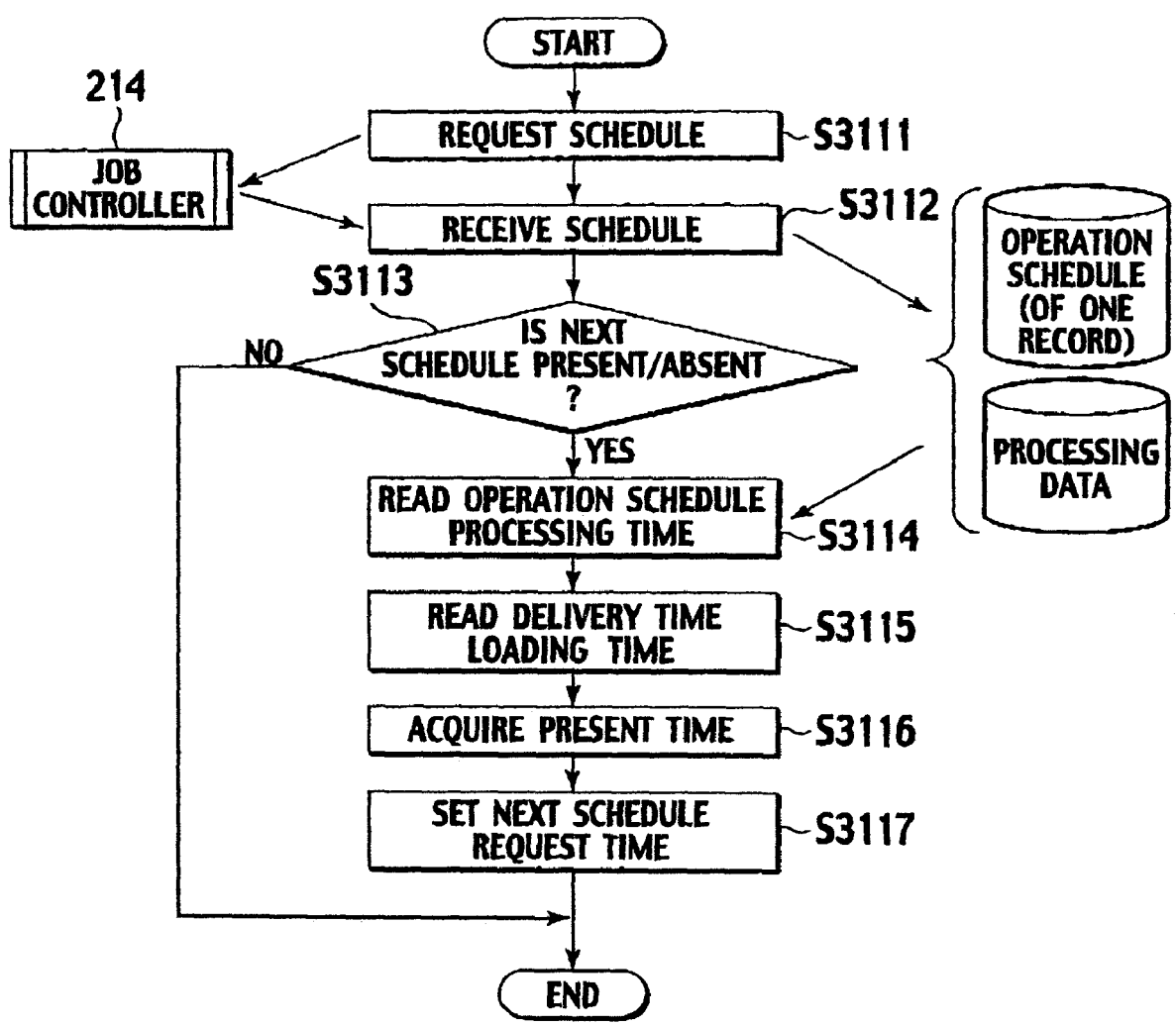
FIG. 32 is a flow chart showing an operation of a schedule request process in the flow of the cell operation task.

FIG. 32 is a flow chart of a schedule request process (step S3110) in the flow of the cell operation task described above.

As shown in FIG. 32, in the schedule request process, the cell controller 231 requests a schedule to the job controller 214 (step S3111).

In the schedule request process, when the cell controller 231 receives the schedule from the job controller 214 (step S3112), the cell controller 231 stores an operation schedule of one record and a processing schedule of one record.

Subsequently, in the schedule request process, the cell controller 231 decides whether there is a next schedule (step S3113). When there is no next schedule (NO in step S3113), the cell controller 231 ends the schedule request process.

On the other hand, when there is a next schedule (YES in step S3113), in the schedule request process, the cell controller 231 reads an operation schedule and processing time (step S3114).

In the schedule request process, the cell controller 231 reads delivery time and loading time (step S3115).

In the schedule request process, the cell controller 231 acquires present time (step S3116).

In the schedule request process, the cell controller 231 sets next schedule request time (step S3117).

Figure 33:
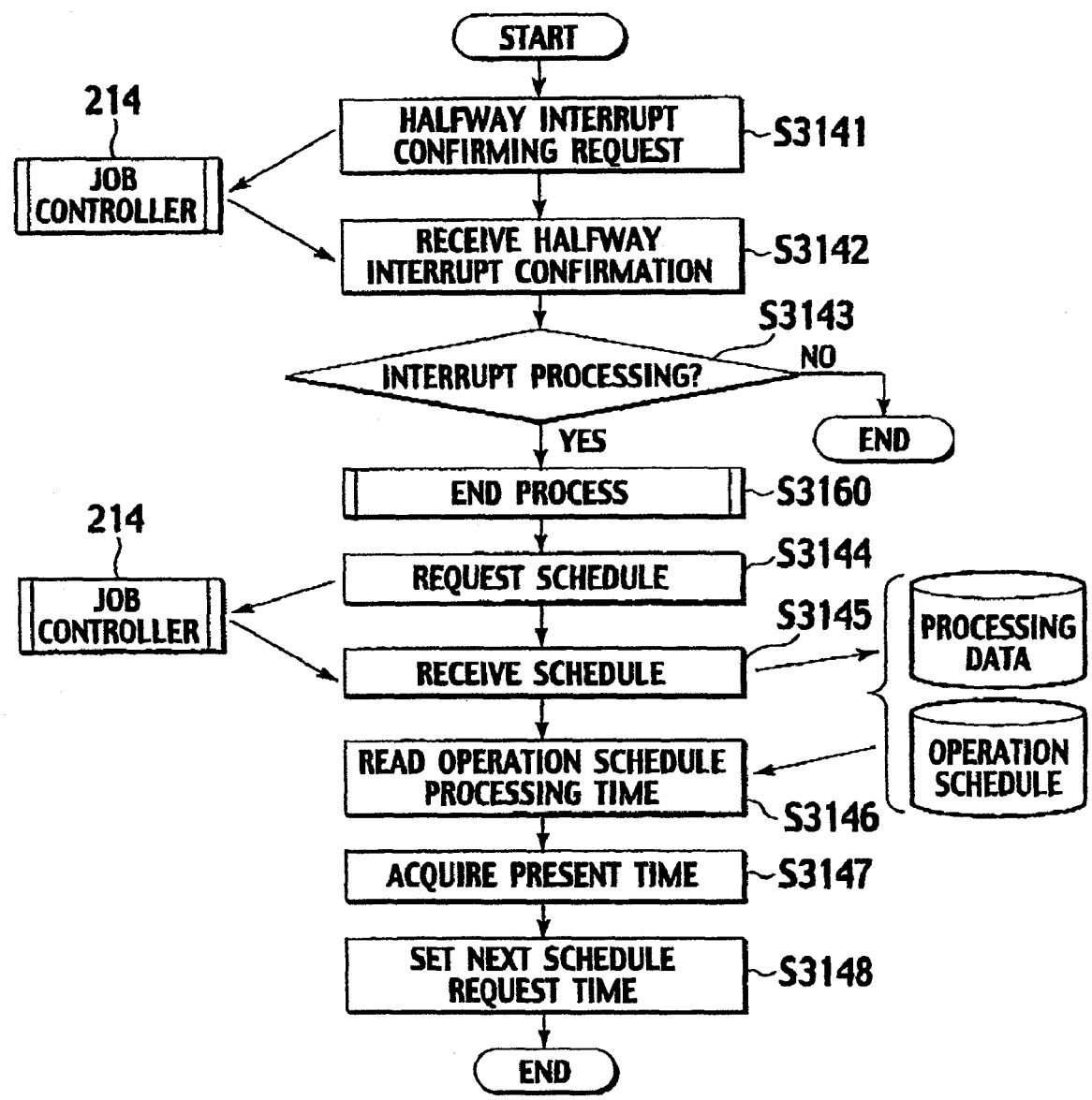
FIG. 33 is a flow chart showing an operation of a halfway interrupts confirming process in the flow of the cell operation task.

FIG. 33 is a flow chart of a halfway interrupt confirmation process (steps S3140 and S3150) in the flow of the cell operation task described above.

As shown in FIG. 33, in the halfway interrupt confirmation process, the cell controller 231 requests the job controller 214 to perform halfway interrupt confirmation (step S3141).

In the halfway interrupt confirmation process, the cell controller 231 receives halfway interrupt confirmation result from the job controller 214 (S3142).

Subsequently, in the halfway interrupt confirmation process, the cell controller 231 decides whether there is interrupt processing (step S3143). When there is no interrupt processing (NO in step S3143) corresponding to the "no-interrupt" response (step S1704) of the halfway interrupt response process in FIG. 29, the cell controller 231 ends the halfway interrupt confirmation process.

On the other hand, when there is interrupt processing (YES in step S3143) corresponding to the "interrupt processing to another sheet consisting of the same material" (step S1709) of the halfway interrupt response process in FIG. 29 or the "interrupt processing to the same sheet" response (step S1710), in the halfway interrupt confirmation process, the cell controller 231 executes an end process (step S3160).

Figure 34:
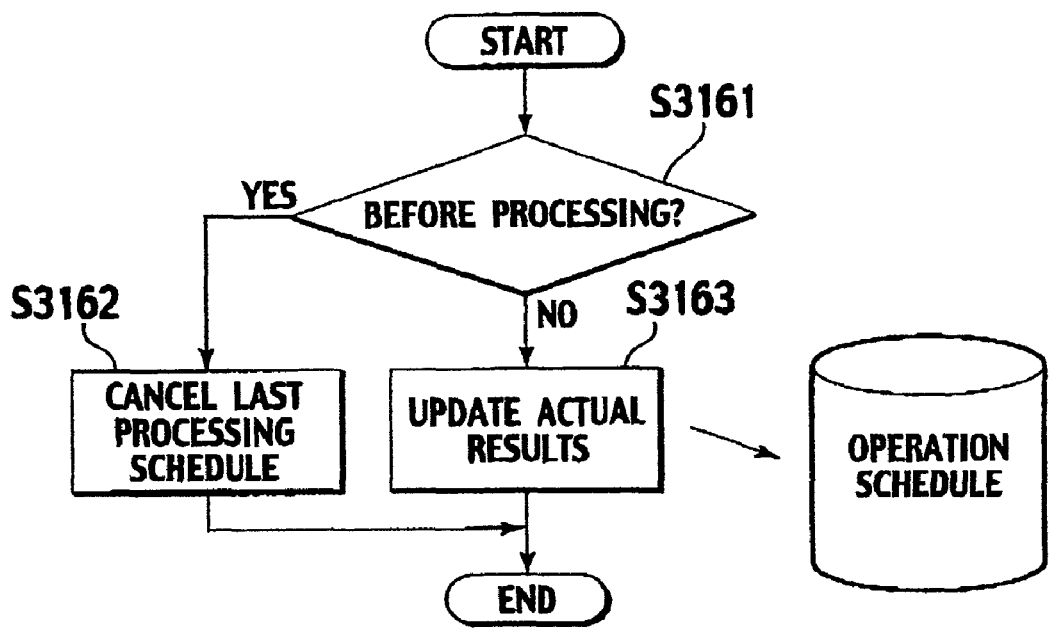
FIG. 34 is a flow chart showing an operation of an ending process in the flow of the cell operation task.

The end process (step S3160) will be described below. FIG. 34 is a flow chart of the end process (step S3160).

As shown in FIG. 34, in the end process, the cell controller 231 decides whether processing is completed (step S3161).

More specifically, when the response of the halfway interrupts response process is "interrupt processing to another sheet consisting of the same material" (step S1709), the corresponding sheet is not processed (YES in step S3161). For this reason, in the end process, the cell controller 231 cancels the last processing schedule (step S3162).

On the other hand, when the response of the halfway interrupts response process is "interrupt processing to the same sheet" (step S1710), the corresponding sheet has been partially processed (NO in step S3161), in the end process, the cell controller 231 updates the last processing actual results (step S3163).

An end process (step S3160) in the flow of the cell operation task in FIG. 31 is the same as described above. More specifically, in the end process under the same material halfway interrupt confirmation process (step S3140), another sheet consisting of the same material is not processed (YES in step S3161). For this reason, the cell controller 231 cancels the last processing schedule (step S3162).

On the other hand, in the end process under the sane sheet halfway interrupt confirmation process (step S3150), since the corresponding sheet has been partially processed (NO in step S3161), the cell controller 231 updates the last processing actual results (step S3163).

In this manner, although the "same material halfway interrupt confirmation process" shown as step S3140 in FIG. 31 and the "same sheet halfway interrupt confirmation process" shown as step S3150 in FIG. 31 are differently named for descriptive convenience, both the processes mean the "halfway interrupt confirmation process" shown in FIG. 33 each.

Here, in the end process (step S3160) at the end of the flow in FIG. 31, the cell controller 231 updates the actual results (step S3163) of the processing process (step S3127).

Returning to FIG. 33, in the halfway interrupt confirmation process, the cell controller 231 requests a schedule to the job controller 214 (step S3144).

In the halfway interrupt confirmation process, when the cell controller 231 receives a schedule from the job controller 214 (step S3145), the cell controller 231 stores an operation schedule of one record and a processing schedule of one record.

In the halfway interrupt confirmation process, the cell controller 231 reads the operation schedule and the processing time (step S3146).

In the halfway interrupt confirmation process, the cell controller 231 acquires present time (step S3147).

Finally, in the halfway interrupt confirmation process, the cell controller 231 sets next schedule request time (step S3148).

Figure 35:
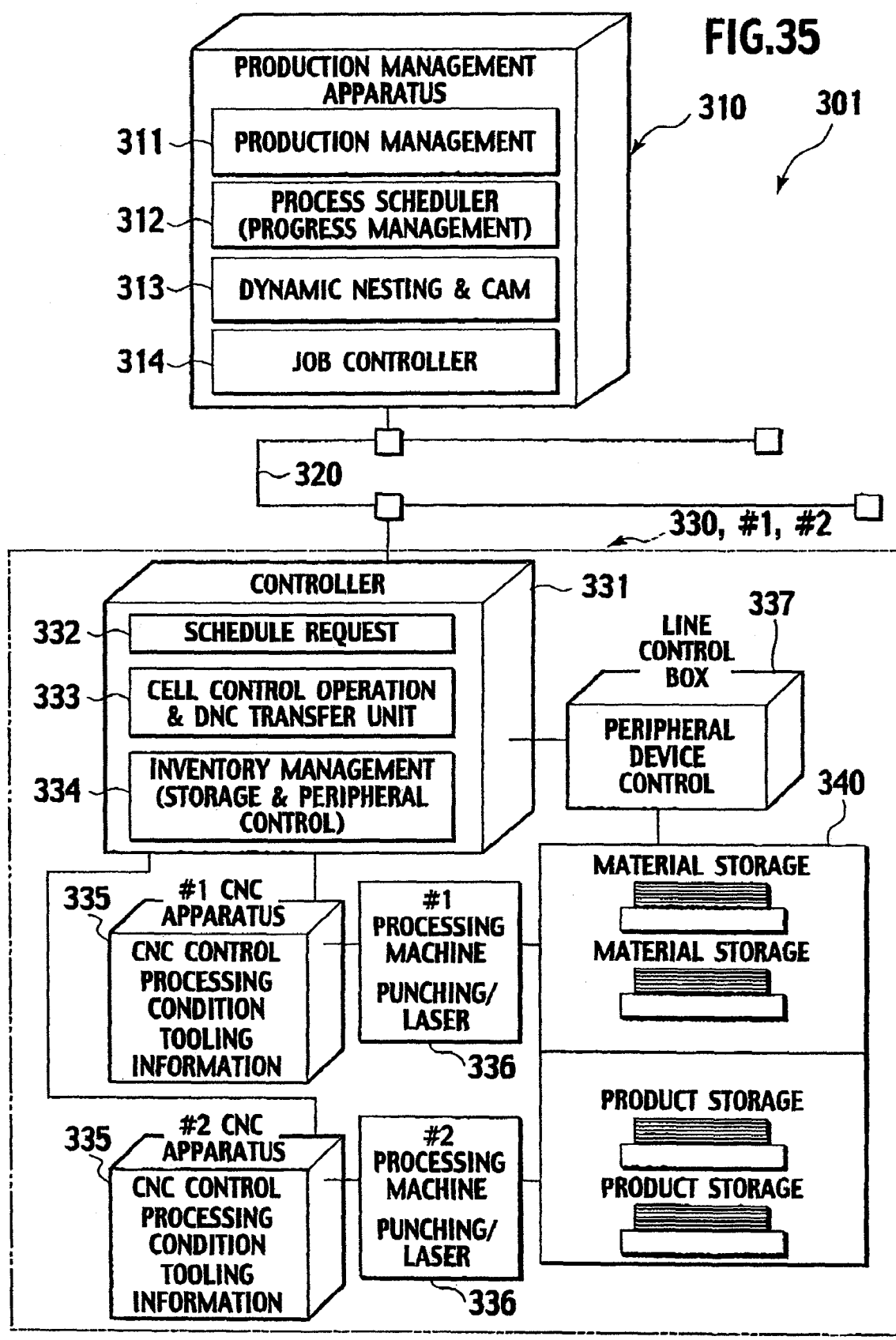
FIG. 35 is a schematic block diagram showing a third embodiment of the sheet metal factory processing system according to the invention.

FIG. 35 is a schematic block diagram showing a third embodiment of the sheet metal factory processing system according to the invention. In a sheet metal factory processing system 301, two sheet metal factory processing installations 330 (#1 and #2) share a controller 331, a line control box 337, and a peripheral device 340. The controller 331 is connected to a production management apparatus 310 through a network 320.

The configuration of the production management apparatus 310 and the configuration of the sheet metal factory processing installations (sheet metal factory processing installation cells) 330 are substantially the same as those in the sheet metal factory processing system 101 shown in FIG. 1. For this reason, the same reference numerals as in FIG. 1 denote the same parts in FIG. 35, and a detailed description thereof will be omitted such that a number 200 is added to the same reference numerals used in FIG. 1 each. Only the peripheral device 340 will be described below with reference to FIG. 36.

Figure 36:
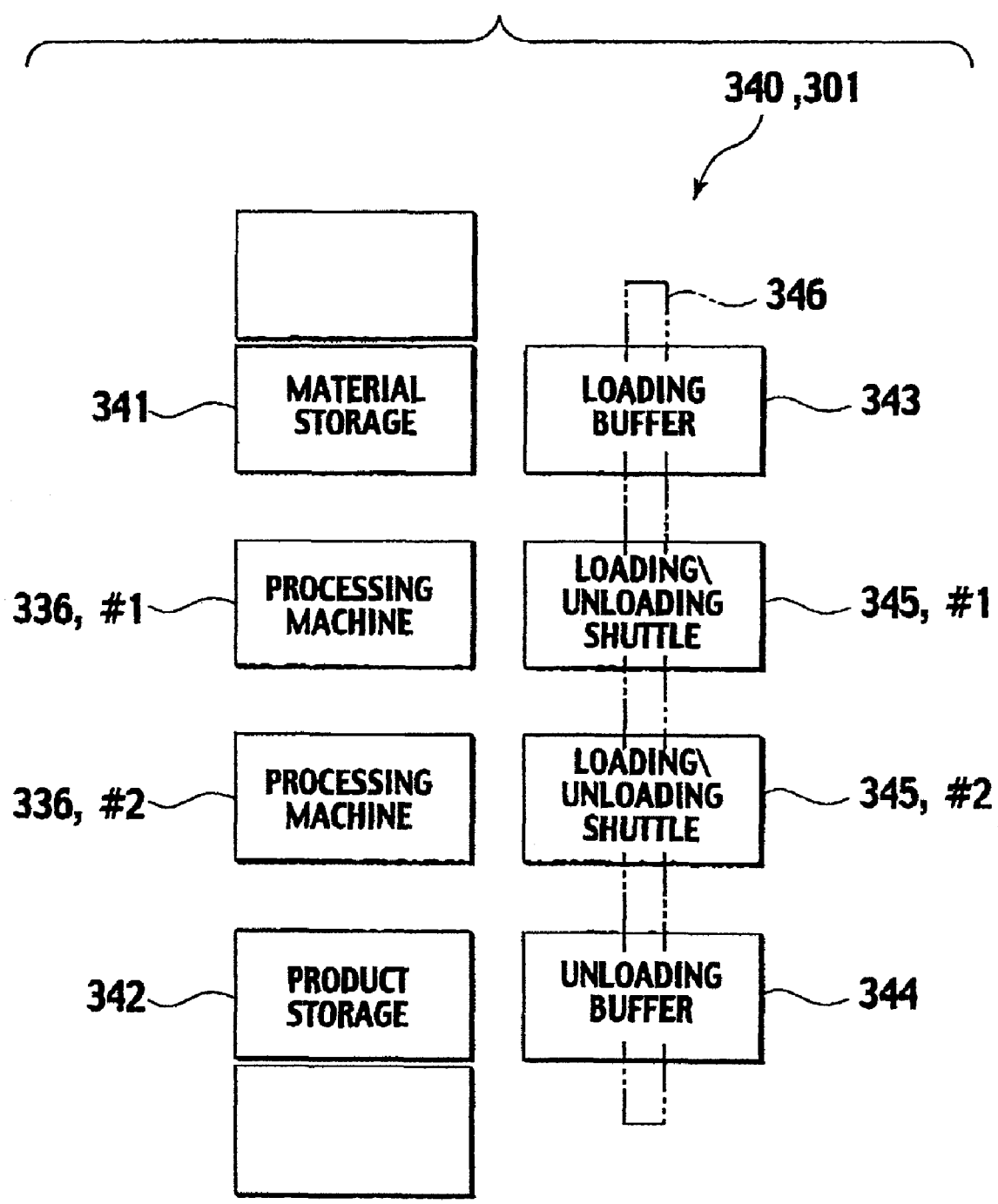
FIG. 36 is a schematic diagram showing an arrangement of peripheral devices in the sheet metal factory processing system in FIG. 35.

FIG. 36 is a schematic diagram showing an arrangement of the peripheral device 340 in the sheet metal factory processing system 301. The peripheral device 340 includes a material storage 341, a product storage 342, a loading buffer 343, an unloading buffer 344, two loading/unloading shuttles 345 (#1 and #1), and a single-sheet pickup and conveying device 346 which are arranged around two processing machines 336 (#1 and #2).

In the sheet metal factory processing system 301, the two sheet metal factory processing installations 330 (#1 and #2) are constituted as an integrated unit from the first. For this reason, a processing schedule is handled as sheet metal factory processing installation units 330 (#1 and #2), so that precise optimum scheduling can be performed.

In this manner, a stop (waiting) time of the unit can be shortened. Therefore, a stop (waiting) time of the entire system is shortened to make it possible to improve the operating rate and the production efficiency of the entire system.

Figure 37:
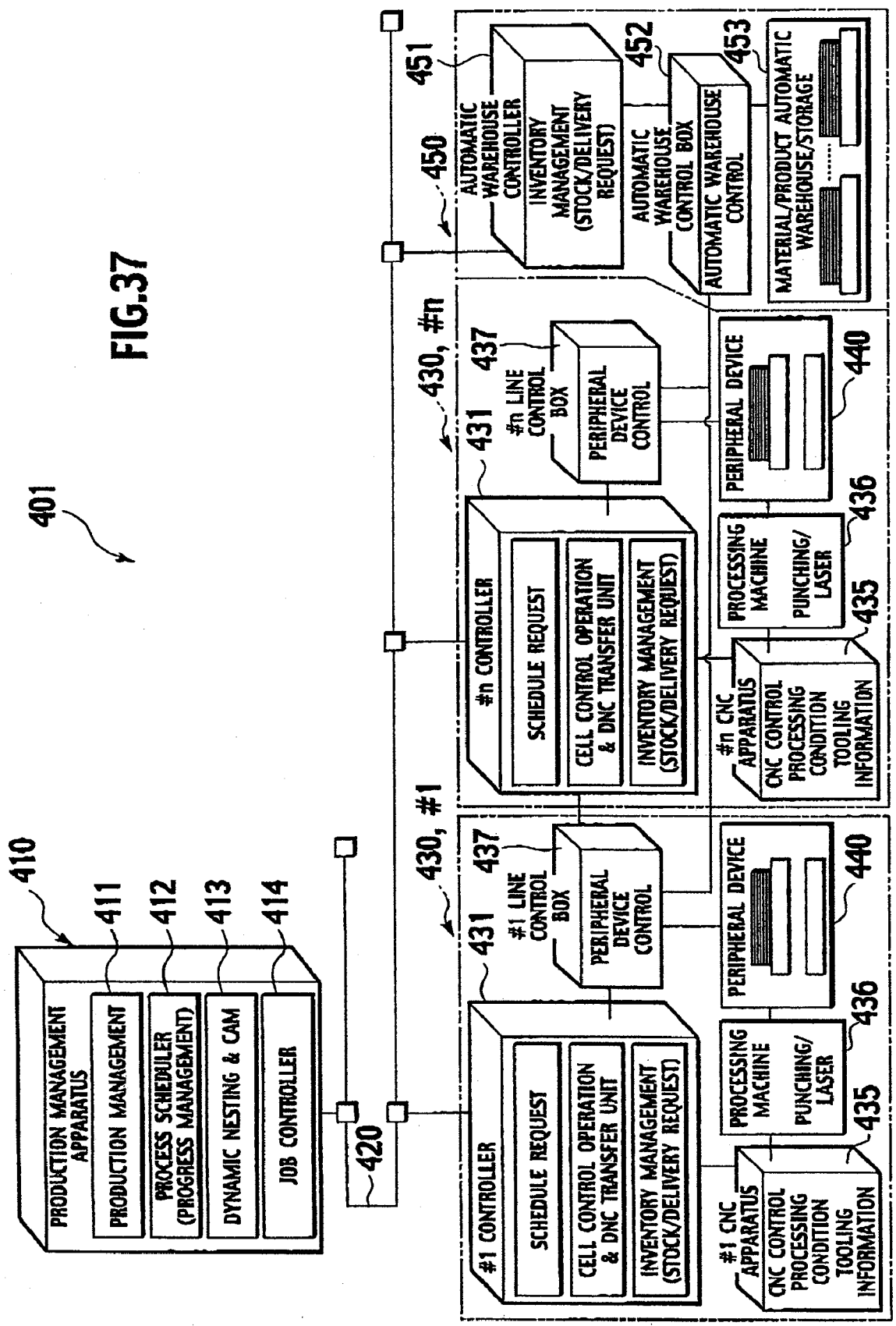
FIG. 37 is a schematic block diagram showing a fourth embodiment of the sheet metal factory processing system according to the invention.

FIG. 37 is a schematic block diagram showing a fourth embodiment of the sheet metal factory processing system according to the invention. In the sheet metal factory processing system 401, a production management apparatus 410, a plurality of sheet metal factory processing installations (sheet metal factory processing installation cells) 430 (#1 to #n), and a automatic warehouse installation 450 are connected to the network 420.

The configuration of the production management apparatus 410 and the configuration of the sheet metal factory processing installations 430 are substantially the same as those in the sheet metal factory processing system 101 shown in FIG. 1. For this reason, the same reference numerals as in FIG. 1 denote the same parts in FIG. 37, and a detailed description thereof will be omitted such that a number 300 is added to the same reference numerals used in FIG. 1 each.

The automatic warehouse installation 450 includes an automatic warehouse controller 451, an automatic warehouse control box 452, and a material/product automatic warehouse/storage installation 453. In the automatic warehouse installation 450, the automatic warehouse controller 451 is connected to the network 420.

The automatic warehouse controller 451 exchanges various data with a job controller 414 of the production management apparatus 410 through the network 420, and also exchanges various necessary data with the components of the automatic warehouse installation 450.

The automatic warehouse control box 452 is connected to line control boxes 437 of the plurality of the sheet metal factory processing installations 430 (#1 to #n). The automatic warehouse control box 452 controls delivery and storage of a material/product in cooperation with peripheral devices 440 in the sheet metal factory processing installations 430 (#1 to #n).

Figure 38:
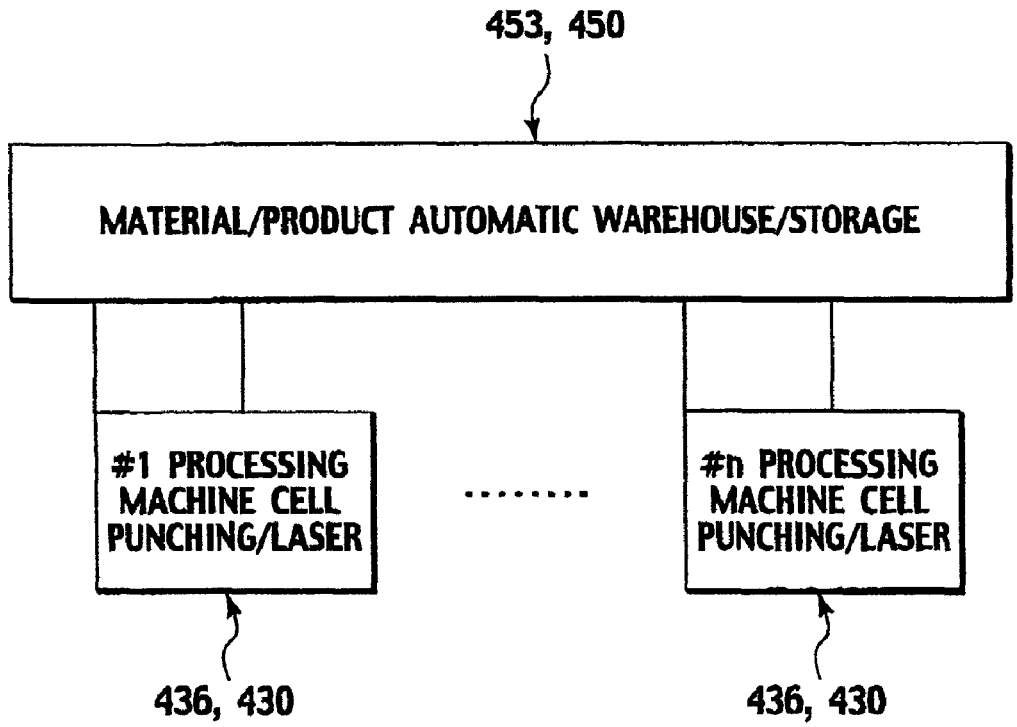
FIG. 38 is a schematic diagram showing an arrangement of automatic warehouse installation and sheet metal factory processing installations.

The material/product automatic warehouse/storage installation 453, as shown in FIG. 38, is combined to processing machine cells 436 including the peripheral devices 440 of the sheet metal factory processing installations 430 (#1 to #n). The material/product automatic warehouse/storage installation 453 delivers and supplies necessary material sheets to all the processing machine cells 436 (#1 to #n) and receives processed sheets (products) from the processing machine cells 436 (#1 to #n) to store the processed sheets.

In the sheet metal factory processing system 401, as in the sheet metal factory processing system 201 shown in FIG. 18, optimum scheduling is performed to the processing schedules of the plurality of sheet metal factory processing installations 430 (#1 to #n), so that a stop (waiting) lime of the entire system is shortened to make it possible to improve the operating rate and the production efficiency of the system.

Although the invention has been described above by reference to certain embodiments of the invention, the invention is not limited to the embodiments described above. Modifications and variations of the embodiments described above will occur to those skilled in the art, in light of the above teachings. The scope of the invention is defined in the following claims.

What is claimed is:

1. A sheet metal factory processing system, comprising:
    a production manager that
        prepares designations which define a plurality of parts to be blanked from a plurality of material sheets,
        generates sheet processing data by laying out the plurality of parts to be blanked from the plurality of material sheets on the plurality of material sheets, and
        generates a processing schedule for the plurality of the material sheets based on the sheet processing data, the processing schedule including a plurality of processing schedule portions respectively corresponding to the plurality of material sheets; and
    a sheet metal factory processing installation that is connected to the production manager through a communication network, receives one of the generated processing schedule portions from the production manager, and processes a predetermined one of the plurality of material sheets according to the received processing schedule portion to blank the parts laid out on the predetermined one of the plurality of material sheets,
    wherein, the processing schedule includes status data respectively corresponding to the plurality of processing schedule portions, each of the status data indicating at least whether a corresponding processing schedule portion is processed or unprocessed, and
    when a change is made to the manufacturing designations, the production manager integrates an unprocessed processing schedule portion, whose status data included in the processing schedule indicates unprocessed, with content of the change, to generate a revised processing schedule according to the changed manufacturing designations.

2. A sheet metal factory processing system, comprising:
    a production manager that
        prepares manufacturing designations which define a plurality of parts to be blanked from a plurality of material sheets,
        generates sheet processing data by laying out the plurality of parts to be blanked from the plurality of material sheets on the plurality of material sheets, and
        generates a processing schedule for the plurality of the material sheets based on the sheet processing data, the processing schedule including a plurality of processing schedule portions respectively corresponding to the plurality of material sheets; and
    a sheet metal factory processing installation that is connected to the production manager through a communication network, receives one of the generated processing schedule portions from the production manager, and processes a predetermined one of the plurality of material sheets according to the received processing schedule portion to blank the parts laid out on the predetermined one of the plurality of material sheets,
    wherein the production manager transmits the one of the processing schedule portions for the one of the plurality of material sheets in response to receiving a processing schedule request from the sheet metal factory processing installation, and
    wherein, the processing schedule includes status data respectively corresponding to the plurality of processing schedule portions, each of the status data indicating at least whether a corresponding processing schedule portion is processed or unprocessed, and
    when a change is made to the manufacturing designations, the production manager integrates an unprocessed processing schedule portion, whose status data included in the processing schedule indicates unprocessed, with content of the change, to generate a revised processing schedule according to the changed manufacturing designations.

3. A sheet metal factory processing system, comprising:
    a production manager that
        prepares manufacturing designations which define a plurality of parts to be blanked from a plurality of material sheets,
        generates sheet processing data by laying out the plurality of parts to be blanked from the plurality of material sheets on the plurality of material sheets, and
        generates a processing schedule for the plurality of the material sheets based on the sheet processing data, the processing schedule including a plurality of processing schedule portions respectively corresponding to the plurality of material sheets; and
    a plurality of sheet metal factory processing installations that are connected to the production manager through a communication network, each of the plurality of sheet metal factory processing installations receiving one of the generated processing schedule portions from the production manager and processing a predetermined one of the plurality of material sheets according to the received processing schedule portion to blank the parts laid out on the predetermined one of the plurality of material sheets, independently of the other of the plurality of sheet metal factory processing installations,
    wherein, the processing schedule includes status data respectively corresponding to the plurality of processing schedule portions, each of the status data indicating at least whether a corresponding processing schedule portion is processed or unprocessed, and
    when a change is made to the manufacturing designations, the production manager integrates an unprocessed processing schedule portion, whose status data included in the processing schedule indicates unprocessed, with content of the change, to generate a revised processing schedule according to the changed manufacturing designations.

4. A sheet metal factory processing system, comprising:
    a production manager that
        prepares manufacturing designations which define a plurality of parts to be blanked from a plurality of material sheets,
        generates sheet processing data by laying out the plurality of parts to be blanked from the plurality of material sheets on the plurality of material sheets, and
        generates a processing schedule for the plurality of the material sheets based on the sheet processing data, the processing schedule including a plurality of processing schedule portions respectively corresponding to the plurality of material sheets; and
    a plurality of sheet metal factory processing installations that are connected to the production manager through a communication network, each of the plurality of sheet metal factory processing installations receiving one of the generated processing schedule portions from the production manager and processing a predetermined one of the plurality of material sheets according to the received processing schedule portion to blank the parts laid out on the predetermined one of the plurality of material sheets, independently of the other of the plurality of sheet metal factory processing installations, wherein the production manager transmits the one of the processing schedule portions for the one of the plurality of material sheets in response to receiving a processing schedule request from one of the plurality of sheet metal factory processing installations, and wherein, the processing schedule includes status data respectively corresponding to the plurality of processing schedule portions, each of the status data indicating at least whether a corresponding processing schedule portion is processed or unprocessed, and when a change is made to the manufacturing designations, the production manager integrates an unprocessed processing schedule portion, whose status data included in the processing schedule indicates unprocessed, with content of the change, to generate a revised processing schedule according to the changed manufacturing designations.

5. A processing schedule management method, comprising:

preparing manufacturing which define a plurality of parts to be blanked from a plurality of material sheets;

generating sheet processing data by laying out the plurality of parts to be blanked from the plurality of material sheets on the plurality of material sheets;

generating a processing schedule for the plurality of the material sheets based on the sheet processing data, the processing schedule including a plurality of processing schedule portions respectively corresponding to the plurality of material sheets; and providing one of the generated processing schedule portions to a sheet metal factory processing installation that processes a predetermined one of the plurality of material sheets according to the provided processing schedule portion to blank the parts laid out in the predetermined one of the plurality of material sheets, wherein, the processing schedule includes status data respectively corresponding to the plurality of processing schedule portions, each of the status data indicating at least whether a corresponding processing schedule portion is processed or unprocessed, and the processing schedule management method further comprising:

including, in the manufacturing designations, an unprocessed part, which has been laid out on a material sheet corresponding to an unprocessed processing schedule portion, whose status data included in the processing schedule indicates unprocessed; and again laying out the unprocessed part on the plurality of material sheets, so that a revised processing schedule is generated.

6. The processing schedule management method according to claim 5, wherein when the unprocessed part is again laid out, the unprocessed part can be laid out on a material sheet that is different from the one of the plurality of material sheets, on which the unprocessed part was laid out.

7. A computer readable medium for storing a program which causes a computer, arranged in one of a production manager and a sheet metal factory processing installation, to execute a process including:

including, in a content of a change to manufacturing designations, an unprocessed part laid out on one of a plurality of material sheets corresponding to an unprocessed processing schedule portion included in a processing schedule generated for the plurality of material sheets, the processing schedule including a plurality of processing schedule portions respectively corresponding to the plurality of material sheets and respectively include status data, each of the status data indicating at least whether a corresponding processing schedule portion is processed or unprocessed, the unprocessed processing schedule portion including the status data indicating unprocessed, the processing schedule being generated based on sheet processing data obtained by laying out parts to be blanked from the plurality of material sheets on the plurality of material sheets according to manufacturing designations, which define the parts to be blanked from the plurality of material sheets; and again laying out the unprocessed part on the plurality of material sheets, according to the content of the change to the manufacturing designations, to generate a revised processing schedule.

8. The computer readable medium according to claim 7, wherein when the program stored in the computer medium causes the computer to again lay out the unprocessed part, the unprocessed part can be laid out on a material sheet that is different from the one of the plurality of material sheets, on which unprocessed the part was laid out.

9. A computer readable medium for storing a program which causes a computer, arranged in one of a production manager and a sheet metal factory processing installation, to execute a process including:

determining a state of change in the sheet metal factory processing installation at which a part is not blanked during processing one of a plurality of material sheets according to one of a plurality of processing schedule portions included in a processing schedule generated for the plurality of material sheets, the processing schedule being generated based on sheet processing data obtained by laying out parts to be blanked from the plurality of material sheets on the plurality of material sheets according to manufacturing designations, which defines the parts to be blanked from the plurality of material sheets; and again laying out the part that was not blanked, on the plurality of material sheets, to generate a revised processing schedule, according to the determination of the state of change in the sheet metal factory processing installation.

10. The computer readable medium according to claim 9, wherein when the program stored in the computer medium causes the computer to again lay out the part that was not blanked, the part that was not blanked can be laid out on a material sheet that is different from the one of the plurality of material sheets, on which the part was laid out.

11. A processing schedule management method, comprising:

preparing manufacturing designations which define a plurality of parts to be blanked from a plurality of material sheets;

generating sheet processing data by laying out the plurality of parts to be blanked from the plurality of material sheets on the plurality of material sheets;

generating a processing schedule for the plurality of the material sheets based on the sheet processing data, the processing schedule including a plurality of processing schedule portions respectively corresponding to the plurality of material sheets;

providing one of the generated processing schedule portions to a sheet metal factory processing installation that processes a predetermined one of the plurality of material sheets according to the provided processing schedule portion to blank the parts laid out in the predetermined one of the plurality of material sheets; and again laying out an unprocessed part on the plurality of material sheets so that a revised processing schedule is generated, the unprocessed part being one of the plurality of parts not blanked during processing the predetermined one of the plurality of material sheets according to the one of the processing schedule portions, due to a state of the sheet metal factory processing installation, wherein when the unprocessed part is again laid out, the unprocessed part can be laid out on a material sheet that is different from the one of the plurality of material sheets, on which the unprocessed part was laid out.

* * * * *

UNITED STATES PATENT AND TRADEMARK OFFICE
CERTIFICATE OF CORRECTION

| | | |
|---|---|---|
| PATENT NO. | : 7,826,913 B2 | Page 1 of 1 |
| APPLICATION NO. | : 11/680747 | |
| DATED | : November 2, 2010 | |
| INVENTOR(S) | : M. Kanazawa et al. | |

It is certified that error appears in the above-identified patent and that said Letters Patent is hereby corrected as shown below:

At column 25, line 12 (claim 1, line 3) of the printed patent, insert -- manufacturing -- after prepares.

At column 27, line 25 (claim 5, line 3) of the printed patent, insert -- designations -- after manufacturing.

Signed and Sealed this
Eighth Day of March, 2011

David J. Kappos
*Director of the United States Patent and Trademark Office*